US 12,332,548 B2

(12) United States Patent
Lee et al.

(10) Patent No.: US 12,332,548 B2
(45) Date of Patent: Jun. 17, 2025

(54) CAMERA MODULE

(71) Applicant: Samsung Electro-Mechanics Co., Ltd., Suwon-si (KR)

(72) Inventors: Jong Gi Lee, Suwon-si (KR); Ju Hwa Son, Suwon-si (KR); Jong Ho Ahn, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 474 days.

(21) Appl. No.: 17/149,071

(22) Filed: Jan. 14, 2021

(65) Prior Publication Data

US 2022/0128888 A1 Apr. 28, 2022

(30) Foreign Application Priority Data

Oct. 28, 2020 (KR) .................. 10-2020-0141518

(51) Int. Cl.
*G03B 17/12* (2021.01)
*G02B 7/02* (2021.01)

(52) U.S. Cl.
CPC ............. *G03B 17/12* (2013.01); *G02B 7/021* (2013.01); *G02B 7/025* (2013.01)

(58) Field of Classification Search
CPC .......... G02B 7/02; G02B 7/021; G02B 7/022; G02B 7/023; G02B 7/025; G02B 7/026
See application file for complete search history.

(56) References Cited

U.S. PATENT DOCUMENTS

| 5,548,450 A | 8/1996 | Kang |
| 5,973,862 A | 10/1999 | Hashizume |
| 8,456,769 B2 * | 6/2013 | Teraoka ................. G02B 7/028 359/822 |
| 9,069,119 B2 * | 6/2015 | Takase ................... G02B 7/021 |
| 11,194,116 B2 | 12/2021 | Wei |
| 2006/0228103 A1 | 10/2006 | Go |
| 2012/0019905 A1 * | 1/2012 | Teraoka ................. G02B 7/021 359/356 |

(Continued)

FOREIGN PATENT DOCUMENTS

| CN | 101504481 A | 8/2009 |
| CN | 102331611 A | 1/2012 |

(Continued)

OTHER PUBLICATIONS

Taiwan Office Action issued on Mar. 17, 2022, issued in the corresponding Taiwanese Patent Application No. 110101868. (11 pages in English and 9 pages in Chinese).

(Continued)

*Primary Examiner* — Ephrem Z Mebrahtu
(74) *Attorney, Agent, or Firm* — NSIP Law

(57) ABSTRACT

A camera module is provided. The camera module includes a first lens group including a foremost lens disposed closest to an object; a second lens group including a rearmost lens disposed closest to an imaging plane; and a lens barrel in which a first accommodation space and a second accommodating space are formed, the first accommodation space configured to accommodate the first lens group therein, and the second accommodating space configured to accommodate the second lens group therein. The second accommodation space may become narrower from an object side toward the imaging plane.

16 Claims, 16 Drawing Sheets

(56) References Cited

U.S. PATENT DOCUMENTS

| | | | |
|---|---|---|---|
| 2014/0177079 A1 | 6/2014 | Kim | |
| 2015/0219871 A1 | 8/2015 | Kim | |
| 2015/0241656 A1* | 8/2015 | Choi | G02B 7/021 |
| | | | 359/819 |
| 2017/0023762 A1* | 1/2017 | Tobita | G02B 7/022 |
| 2020/0049927 A1* | 2/2020 | Wei | G02B 7/025 |
| 2020/0057237 A1 | 2/2020 | Wei | |
| 2020/0110240 A1 | 4/2020 | Wang | |
| 2020/0301092 A1 | 9/2020 | Shirotori et al. | |
| 2020/0310074 A1 | 10/2020 | Wu et al. | |
| 2021/0109308 A1 | 4/2021 | Seo et al. | |
| 2021/0149145 A1* | 5/2021 | Fang | G02B 7/021 |
| 2021/0396915 A1* | 12/2021 | Chen | G02B 27/0018 |

FOREIGN PATENT DOCUMENTS

| | | |
|---|---|---|
| CN | 103885155 A | 6/2014 |
| CN | 109143522 A | 1/2019 |
| CN | 208636528 U | 3/2019 |
| CN | 208921940 U | 5/2019 |
| CN | 111025514 A | 4/2020 |
| CN | 210639324 U | 5/2020 |
| CN | 210803840 U | 6/2020 |
| CN | 111722344 A | 9/2020 |
| CN | 211653266 U | 10/2020 |
| JP | 11-211957 A | 8/1999 |
| JP | 2006-195139 A | 7/2006 |
| JP | 2007-188034 A | 7/2007 |
| JP | 2010-8743 A | 1/2010 |
| JP | 2020-027293 A | 2/2020 |
| KR | 95-19880 A | 7/1995 |
| KR | 10-2015-0101352 A | 9/2015 |
| TW | I307814 B | 3/2009 |
| TW | 201447413 A | 12/2014 |
| TW | 202036068 A | 10/2020 |

OTHER PUBLICATIONS

Korean Office Action issued on Dec. 1, 2021 in the corresponding Korean Patent Application No. 10-2020-0141518.

Chinese Office Action issued Dec. 29, 2023, in counterpart Chinese Patent Application No. 202110499783.2 (6 pages in English, 9 pages in Chinese).

Chinese Office Action issued on May 17, 2024, in counterpart Chinese Patent Application No. 202110499783.2 (6 pages in English, 8 pages in Chinese).

* cited by examiner

CAMERA MODULE

CROSS-REFERENCE TO RELATED APPLICATION(S)

This application claims the benefit under 35 USC 119(a) of Korean Patent Application No. 10-2020-0141518 filed on Oct. 28, 2020 in the Korean Intellectual Property Office, the entire disclosure of which is incorporated herein by reference, for all purposes.

BACKGROUND

1. Field

The following description relates to a camera module.

2. Description of Related Art

A camera module includes lenses. In an example, a high-resolution camera module includes four or more lenses. The lenses are disposed in a lens barrel. In an example, first to fourth lenses may be sequentially disposed from an object side to an image side of the lens barrel. The camera module includes a component that prevents separation of the lens disposed in the lens barrel. In an example, the camera module may include a press-fit ring or a similar-type ring that fixes the lens to the lens barrel. The press-fit ring may be fixed to the lens barrel by a press-fitting process, or by utilizing an adhesive. However, in an example where the lenses are fixed through the press-fit ring, it may be difficult to secure sufficient coupling force (or a binding force) between the press-fit ring and the lens barrel. Additionally, the number of manufacturing process steps of the camera module may be increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a first lens group, comprising a foremost lens disposed closest to an object; a second lens group, comprising a rearmost lens disposed closest to an imaging plane; and a lens barrel, in which a first accommodation space and a second accommodating space are formed, the first accommodation space configured to accommodate the first lens group therein, and the second accommodating space configured to accommodate the second lens group therein, wherein the second accommodation space is configured to become narrower from an object side toward the imaging plane.

The first lens group may include a plurality of lenses.

The first accommodation space may have a step.

The foremost lens may be configured to be in contact with a plurality of different inner surfaces of the first accommodation space.

The rearmost lens may have a diameter greater than a diameter of a lens closest to a rearmost lens in the first lens group.

An outer peripheral surface of the rearmost lens of the second lens group may form an acute angle with an optical axis.

The camera module may include an interval maintaining member disposed between the first lens group and the second lens group.

In a general aspect, a camera module includes a first lens group, including a foremost lens disposed closest to an object; a second lens group, comprising a rearmost lens disposed closest to an imaging plane and configured to have a diameter greater than a diameter of the foremost lens of the first lens group; and a lens barrel, in which a first accommodation space and a second accommodating space are formed, the first accommodation space configured to accommodate the first lens group therein, and the second accommodating space configured to accommodate the second lens group therein, wherein one or more protrusions, configured to support an image-side surface of the rearmost lens of the second lens group, are formed in the second accommodation space.

The one or more protrusions may be formed at intervals along an inner peripheral surface of the second accommodation space.

The foremost lens may be configured to be in contact with a plurality of different inner surfaces of the first accommodation space.

The rearmost lens of the second lens group may have a diameter greater than a diameter of a lens closest to a rearmost lens in the first lens group.

A distance between an outer peripheral surface of the rearmost lens of the second lens group, and an inner peripheral surface of the second accommodation space may decrease from an object side toward the imaging plane.

A groove, configured to accommodate an adhesive, is formed in the rearmost lens.

The camera module may include an interval maintaining member disposed between the first lens group and the second lens group.

In a general aspect, an electronic device includes a camera module including a lens barrel, wherein the lens barrel includes a first lens group, including a plurality of lenses, where a diameter of a first lens at an object side of the first lens group is smaller than a diameter of a rearmost lens toward an imaging plane of the first lens group; and a second lens group, comprising one or more lenses disposed closest to the imaging plane, wherein a radius of an accommodation space of the second lens group is larger than a maximum radius of an accommodation space of the first lens group.

The accommodation space of the second lens group may be narrower than the accommodation space of the first lens group from an object side to an imaging plane.

An interval maintaining member may be disposed between the first lens group and the second lens group.

Other features and aspects will be apparent from the following detailed description, the drawings, and the claims.

Figure 1:
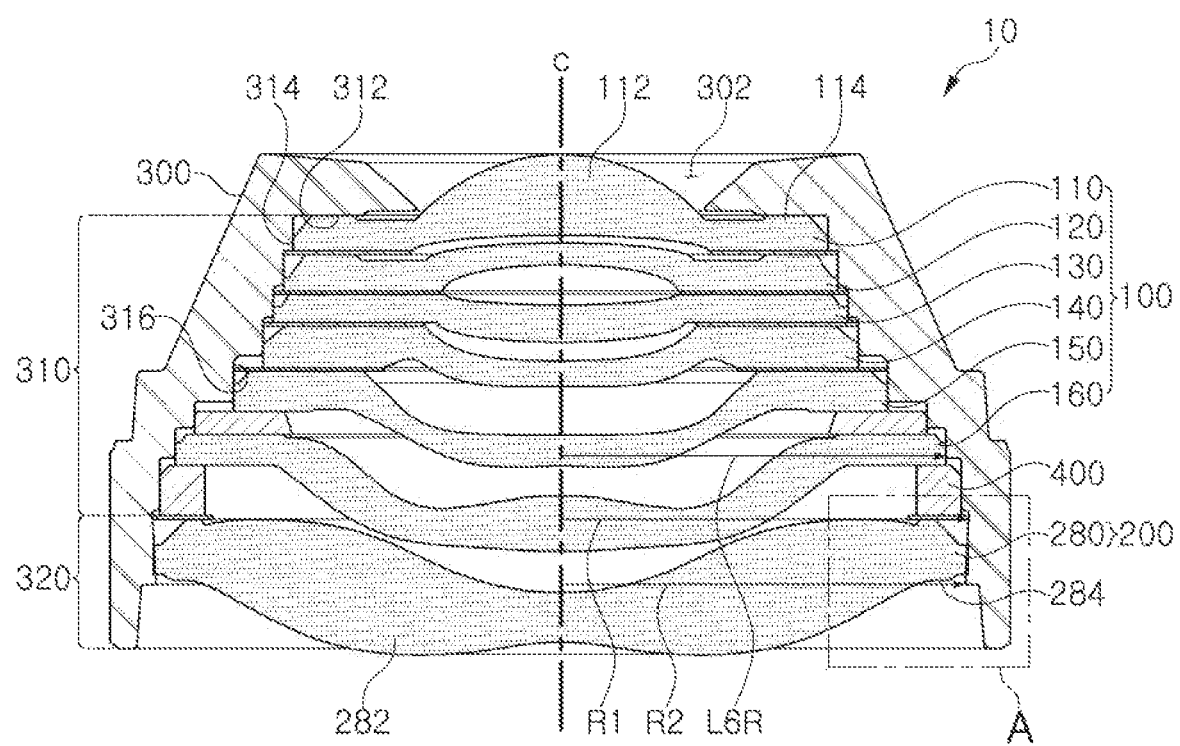
FIG. 1 is a cross-sectional view of an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

A camera module described in the following description may be mounted in a mobile electronic product. In an example, the camera module may be mounted in, for example, a mobile phone, a laptop computer or similar devices. However, a use range of the camera module according to the examples is not limited to the electronic device described above. In an example, the camera module may be mounted in all electronic devices that implement screen capturing and moving image photographing or capture, such as, as non-limiting examples, motion sensing, image capturing, face recognition, iris recognition, virtual reality realization, augmented reality realization, and the like.

A camera module, according to an example, may include a plurality of lens groups. In an example, the camera module may include a first lens group and a second lens group. The first lens group and the second lens group may be classified according to lens positions. In an example, the first lens group may be disposed close to an object side, and the second lens group may be disposed close to an imaging plane. Each of the first lens group and the second lens group may include one or more lenses. In an example, the first lens group may include a foremost lens disposed closest to the object side, and the second lens group may include a rearmost lens disposed closest to the imaging plane. The camera module may include a component that accommodates the lens groups. In an example, the camera module may include a lens barrel. Accommodation spaces that accommodate the first lens group and the second lens group may be formed in the lens barrel. In an example, a first accommodation space that accommodates the first lens group and a second accommodation space that accommodates the second lens group may be formed in the lens barrel. The camera module may be configured to reduce separation of the rearmost lens. In an example, the second accommodation space may be formed to become narrower from the object side toward the imaging plane to reduce a phenomenon in which the rearmost lens is separated from the lens barrel.

The camera module may include three or more lenses. In an example, the first lens group may further include other lenses, in addition to the foremost lens. The first accommodation space of the lens barrel may be configured to accommodate a plurality of lenses. In an example, a plurality of steps may be formed in the first accommodation space. The steps of the first accommodation space may be configured to align positions of the lenses with each other. In an example, the steps of the first accommodation space may be formed to be in individual contact with the lenses of the first lens group to align the positions and optical axes of the lenses with each other.

The foremost lens of the first lens group may be configured to be in contact with a plurality of different inner surfaces of the first accommodation space. In an example, the foremost lens may be in contact with both an upper surface and an inner peripheral surface of the first accommodation space.

The lenses accommodated in the lens barrel may be formed to have diameters that become larger from the object side toward the imaging plane. In an example, a diameter of the rearmost lens may be larger than a diameter of a lens closest to the rearmost lens in the first lens group. Specifically, the rearmost lens may have the largest diameter among the lenses accommodated in the lens barrel. An outer peripheral surface of the rearmost lens may be formed to have an inclination angle with respect to an optical axis. In an example, the outer peripheral surface of the rearmost lens may form an acute angle with the optical axis.

The camera module may further include an interval maintaining member. In an example, the camera module may include an interval maintaining member disposed between the first lens group and the second lens group. The interval maintaining member may serve to maintain a distance between the first lens group and the second lens group at a numerical value according to an optical implementation.

A camera module, in accordance with an embodiment, may include a plurality of lens groups, similar to the example described above. In an example, the camera module may include a first lens group and a second lens group. The first lens group and the second lens group may be classified according to various lens positions. In an example, the first lens group may be disposed close to an object side, and the second lens group may be disposed close to an imaging plane. Each of the first lens group and the second lens group may include one or more lenses. In an example, the first lens group may include a foremost lens disposed closest to the object side, and the second lens group may include a rearmost lens disposed closest to the imaging plane. The camera module may include a component that accommodates the lens groups. In an example, the camera module may include a lens barrel. Accommodation spaces that accommodate the first lens group and the second lens group may be formed in the lens barrel. In an example, a first accommodation space that accommodates the first lens group and a second accommodation space that accommodates the second lens group may be formed in the lens barrel. The camera module may be configured to reduce separation of the rearmost lens. In an example, a protrusion configured to support an image-side surface of the rearmost lens may be formed in the second accommodation space to reduce a phenomenon in which the rearmost lens is separated from the lens barrel.

The protrusion may be formed on an inner peripheral surface of the second accommodation space. In an example, the protrusion may be formed in a circle shape along the inner peripheral surface of the second accommodation space or the protrusions may be formed at intervals along the inner peripheral surface of the second accommodation space. The protrusion according to the former may firmly support the image-side surface of the rearmost lens, and the protrusions according to the latter may make it easy to mount the rearmost lens in the second accommodation space.

The foremost lens of the first lens group may be configured to be in contact with a plurality of different inner surfaces of the first accommodation space. In an example, the foremost lens may be in contact with both an upper surface and an inner peripheral surface of the first accommodation space.

The rearmost lens may be configured to have a diameter greater than a diameter of a lens neighboring to the rearmost lens. In an example, a diameter of the rearmost lens may be larger than a diameter of a lens positioned on an object-side of the rearmost lens or a diameter of a lens closest to the rearmost lens in the first lens group.

An outer peripheral surface of the rearmost lens may be configured to be in line contact with the inner peripheral surface of the second accommodation space. In an example, the rearmost lens may be in contact with the inner peripheral surface of the second accommodation space at a part of the outer peripheral surface thereof having the largest diameter, and the other part of the outer peripheral surface of the rearmost lens may be spaced apart from the inner peripheral surface of the second accommodation space by a predetermined interval. An interval or a distance between the outer peripheral surface of the rearmost lens and the inner peripheral surface of the second accommodation space may decrease from the object side toward the imaging plane.

The camera module may further include a component that maintains firm coupling between the rearmost lens and the lens barrel. In an example, an adhesive may be applied to a contact portion between the rearmost lens and the lens barrel. A space that accommodates the adhesive may be formed in the rearmost lens. In an example, a groove configured to accommodate the adhesive may be formed in the image-side surface of the rearmost lens.

The camera module may further include an interval maintaining member. In an example, the camera module may include an interval maintaining member disposed between the first lens group and the second lens group. The interval maintaining member may maintain a distance between the first lens group and the second lens group at a numerical value according to an optical implementation.

Hereinafter, examples will be described with reference to the drawings.

Figure 2:
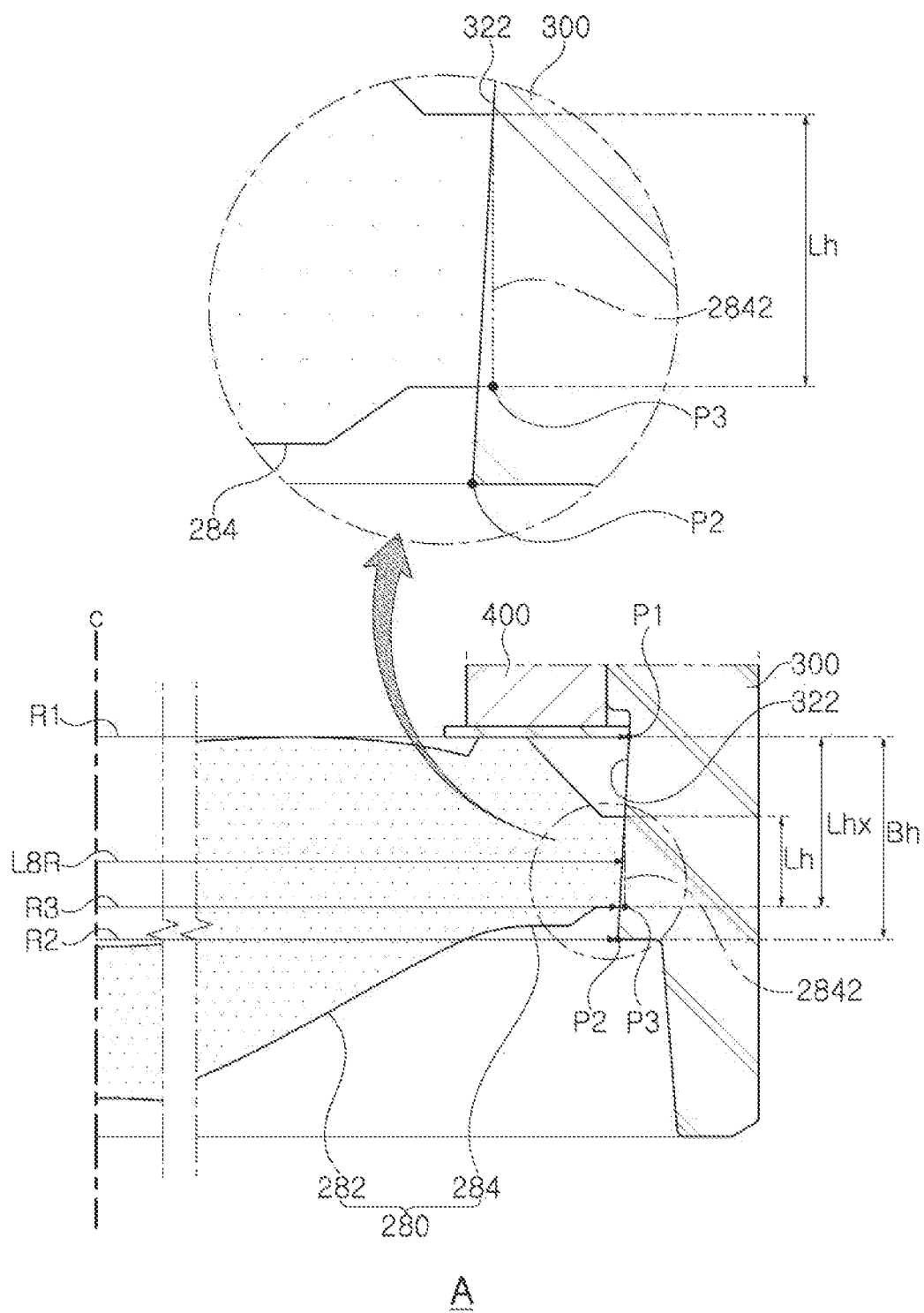
FIG. 2 is an enlarged view of part A illustrated in FIG. 1.
Figure 3:
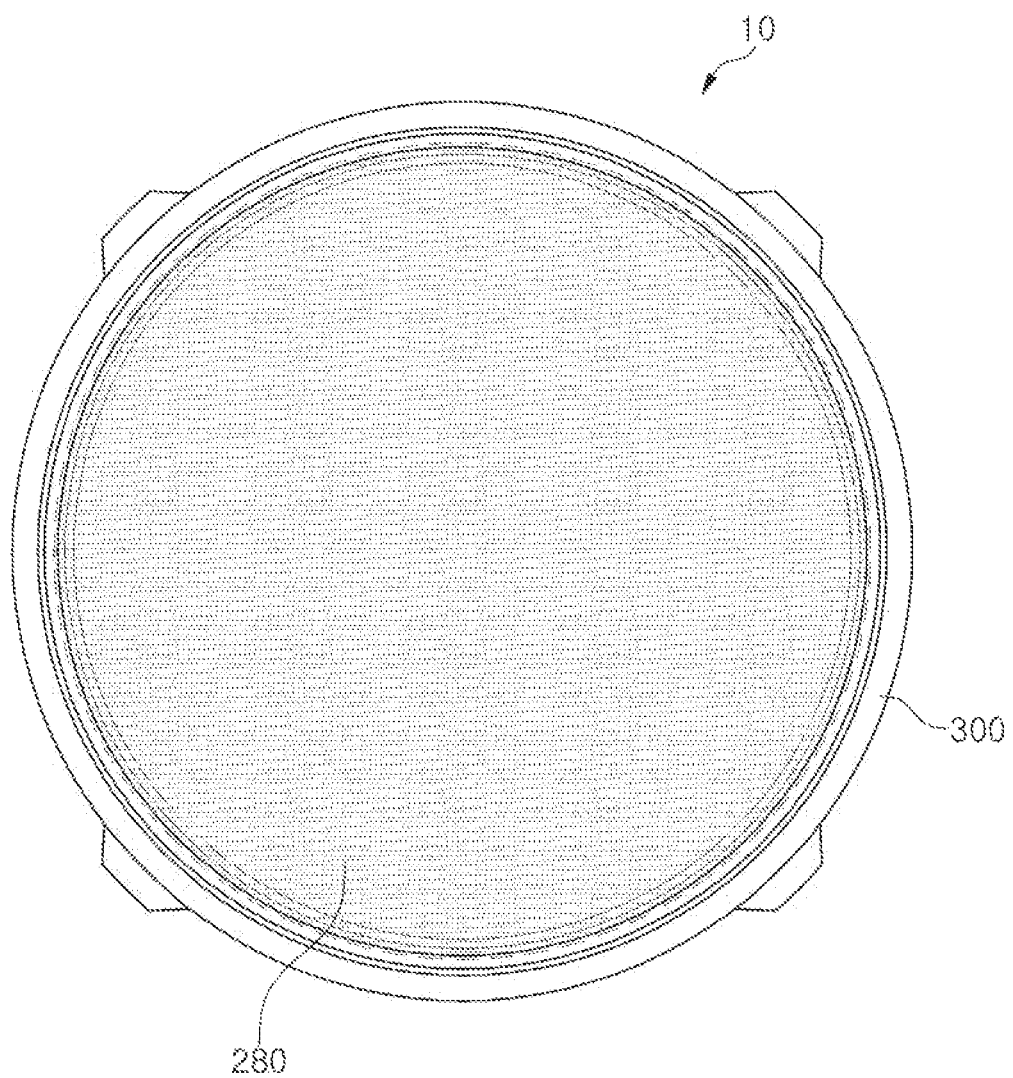
FIG. 3 is a bottom view of the example camera module illustrated in FIG. 1.
Figure 4:
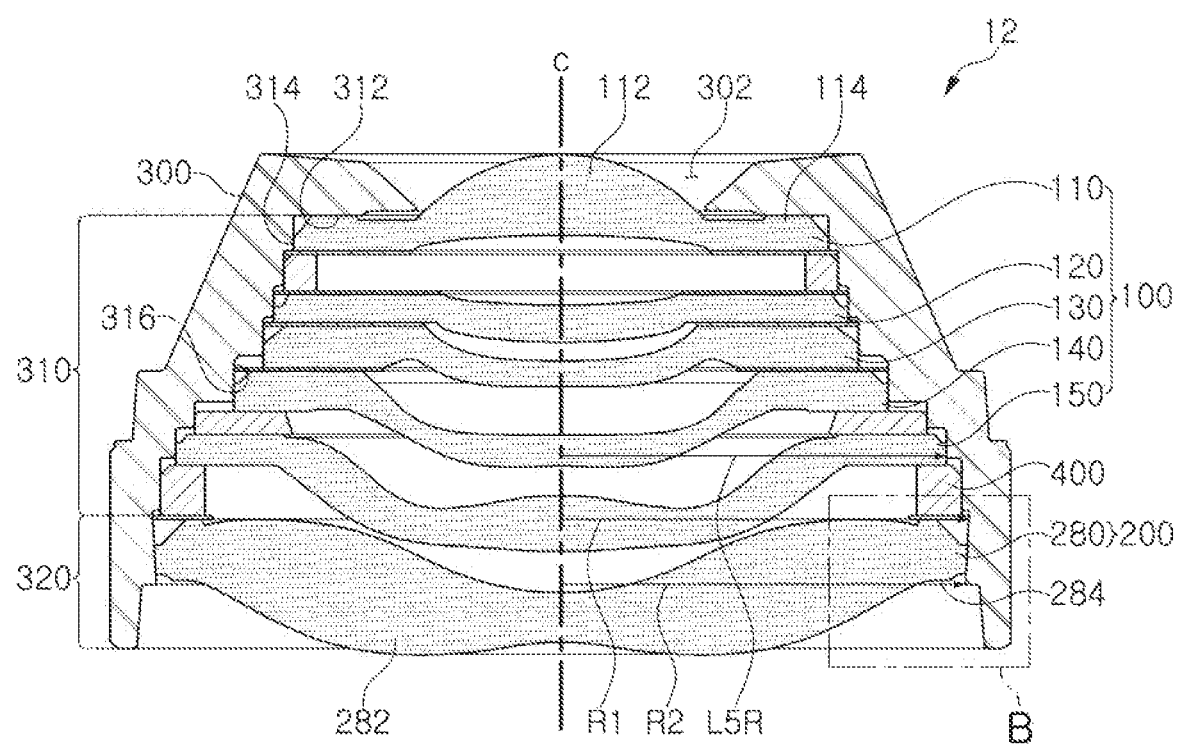
FIG. 4 is a cross-sectional view of an example camera module, in accordance with one or more embodiments.

A camera module, in accordance with one or more embodiments, will be described with reference to FIGS. 1 through 3.

A camera module 10 may include a first lens group 100, a second lens group 200, and a lens barrel 300. However, components of the camera module 10 are not limited to the components described above. For example, the camera module 10 may further include an interval maintaining member 400, a filter (not illustrated), an image sensor (not illustrated), and the like. Additionally, the camera module 10 may further include a driving unit that drives the lens barrel 300 in an optical axis direction or a direction intersecting an optical axis.

The first lens group 100 may include one or more lenses. In an example, the first lens group 100 may include a foremost lens 110 disposed closest to an object. The foremost lens 110 may include an optical portion 112 and a flange portion 114. The optical portion 112 may be configured to exhibit optical performance, and the flange portion 114 may be configured to enable position alignment of the lenses. In an example, the optical portion 112 may be configured to have positive refractive power or negative refractive power, and the flange portion 114 may be configured to be in contact with a neighboring lens or the lens barrel 300. The optical portion 112 may be exposed outward of the lens barrel 300. In an example, the optical portion 112 may be partially or completely exposed through an opening 302 of the lens barrel 300 as illustrated in FIG. 1. In contrast, the flange portion 114 may be configured so as not to be exposed through the opening 302 of the lens barrel 300.

The foremost lens 110 may be disposed at the innermost side of the lens barrel 300. The foremost lens 110 may be in contact with a plurality of different inner surfaces of a first accommodation space 310. For example, an object-side surface of the flange portion 114 is in contact with an upper surface 312 of the first accommodation space 310, and an outer peripheral surface of the flange portion 114 may be in contact with an inner surface 314 of the first accommodation space 310. Therefore, the foremost lens 110 may be mounted in the lens barrel 300, such that the foremost lens 110 may be aligned so that an optical axis thereof coincides with an optical axis C of the lens barrel 300.

The first lens group 100 may include a plurality of lenses. For example, the first lens group 100 may further include one or more lenses, in addition to the foremost lens 110. For reference, the first lens group 100, according to an example, may further include five lenses 120, 130, 140, 150, and 160, in addition to the foremost lens 110. However, the number of lenses constituting the first lens group 100 is not limited to six. In an example, depending on optical performance of the camera module 10, the number of lenses constituting the first lens group 100 may be less than six or may be six or more.

The lenses 110, 120, 130, 140, 150, and 160 of the first lens group 100 may have diameters that become substantially larger from an object side toward an imaging plane. In an example, a second lens 120 may have a diameter greater than a diameter of a first lens 110 (the foremost lens), and a third lens 130 may have a diameter greater than that of the second lens 120. However, positions and sizes of the lenses 110, 120, 130, 140, 150, and 160 are not necessarily in proportion to each other. In an example, a fourth lens 140 and the third lens 130 may be formed to have substantially the same size. A lens disposed closest to the second lens group 200 among the lenses of the first lens group 100 may generally have the largest diameter. In an example, in the present example, a sixth lens 160 may have a diameter greater than diameters of the first to fifth lenses 110 to 150.

The second lens group 200 may include one or more lenses. In an example, the second lens group 200 may include a rearmost lens 280 disposed closest to the imaging plane. The rearmost lens 280 may include an optical portion 282 and a flange portion 284. The optical portion 282 may be configured to exhibit optical performance, and the flange portion 284 may be configured to enable position alignment of the lenses. In an example, the optical portion 282 may be configured to have positive refractive power or negative refractive power, and the flange portion 284 may be configured to be in contact with the lens barrel 300. An outer peripheral surface 2842 (FIG. 2) of the flange portion 284 may be configured to be substantially parallel to the optical axis C.

The lens barrel 300 may be configured to accommodate the first lens group 100 and the second lens group 200 therein. In an example, the first accommodation space 310 and a second accommodation space 320 may be formed inside the lens barrel 300.

The first accommodation space 310 may be configured to accommodate the first lens group 100. In an example, the first accommodation space 310 may be formed to have a size enough to accommodate the lenses 110, 120, 130, 140, 150, and 160 of the first lens group 100. A step 316 may be formed in the first accommodation space 310. In an example, a plurality of steps 316 that specify accommodation positions of the first to sixth lenses 110 to 160, may be formed in the first accommodation space 310. The steps 316 may be formed to have different sizes. In an example, the steps 316 may be formed to have sizes substantially coinciding with sizes of the first to sixth lenses 110 to 160.

The second accommodation space 320 may be configured to accommodate the second lens group 200. In an example, the second accommodation space 320 may be formed to accommodate the rearmost lens 280 of the second lens group 200. The second accommodation space 320 may be formed to become narrower from the object side toward the imaging plane. In an example, the second accommodation space 320 may have a first radius R1 having a maximum size at a first point P1 closest to the object and have a second radius R2 having a minimum size at a second point P2 closest to the imaging plane. Therefore, a cross-sectional area of the second accommodation space 320 may become smaller from the first point P1 toward the second point P2. That is, an inner peripheral surface 322 of the second accommodation space 320 connecting the first point P1 and the second point P2 to each other may be formed to have a first inclination angle with respect to the optical axis C.

The first inclination angle of the inner peripheral surface 322 may be larger than 0° and equal to or less than 1°. When the first inclination angle is 0° (that is, in an example where the inner circumferential surface 322 of the second accommodation space 320 is parallel to the optical axis C), it may be difficult to expect a separation prevention effect of the rearmost lens 280 by the second accommodation space 320, and when the first inclination angle exceeds 1°, it may be difficult to fit the rearmost lens 280 into the second accommodation space 320. Therefore, the first inclination angle of the inner peripheral surface 322 may be limited to be within the range described above. However, the numerical range of the first inclination angle described above may be limited to an example where the outer peripheral surface 2842 of the rearmost lens 280 is substantially parallel to the optical axis C. Therefore, in an example where the outer peripheral surface 2842 of the rearmost lens 280 has a predetermined inclination with respect to the optical axis C, the range of the first inclination angle may be changed.

The second accommodation space 320 may be configured so as not to interfere with the mounting of the first lens group 100. In an example, the second radius R2 of the second accommodation space 320 may be larger than a maximum radius L6R of the sixth lens 160 having a maximum size in the first lens group 100.

The second accommodation space 320 may be configured to block or reduce a phenomenon in which the rearmost lens 280 is separated from the lens barrel 300. As an example, the second radius R2 of the second accommodation space 320 may be smaller than a maximum radius L8R of the rearmost lens 280. As another example, a third radius R3 at a third point P3 in contact with a lower end of the rearmost lens 280 in the second accommodation space 320 may be smaller than a radius L8R of the rearmost lens 280. Therefore, the rearmost lens 280 may be coupled to the inner peripheral surface 322 of the second accommodation space 320 only in a press-fitting manner. Additionally, the outer peripheral surface 2842 of the rearmost lens 280 may be compressed by the inner peripheral surface 322 of the lens barrel 300 to be deformed to have the same inclination as the inner peripheral surface 322, as illustrated in FIG. 2. The press-fitting coupling and frictional coupling between the second accommodation space 320 and the rearmost lens 280 may be uniformly performed along a peripheral direction of the rearmost lens 280 as illustrated in FIG. 3.

The second accommodation space 320 may have a size enough to accommodate the rearmost lens 280. In an example, a length Bh of the second accommodation space 320 may be larger than a distance Lhx from a contact point between the rearmost lens 280 and a front member to a point at which the flange portion 284 and the inner peripheral surface of the second accommodation space 320 are in contact with each other. An excess length (Bh−Lhx) of the second accommodation space 320 may play a large role in preventing the separation of the rearmost lens 280. In an example, a separation prevention effect of the rearmost lens 280 due to a coupling force between the lens barrel 300 and the rearmost lens 280 or the second accommodation space 320 may become large in proportion to the excess length (Bh−Lhx) of the second accommodation space 320. The excess length (Bh−Lhx) of the second accommodation space 320 may be increased or decreased according to the number of lenses accommodated in the lens barrel 300 or a total weight of the lenses. In an example where a number of lenses less than five lenses are accommodated in the lens barrel 300, the excess length (Bh−Lhx) may be decreased, and in a case where five or more lenses are accommodated in the lens barrel 300, the excess length (Bh−Lhx) may be increased.

The camera module 10 may further include the interval maintaining member 400. The interval maintaining member 400 may be disposed between the first lens group 100 and the second lens group 200. For example, the interval maintaining member 400 may be disposed between the sixth lens 160 and the rearmost lens 280. The interval maintaining member 400 may maintain a constant distance between the sixth lens 160 and the rearmost lens 280 in the optical axis direction. Additionally, the interval maintaining member 400 may increase the coupling force between the rearmost lens 280 and the lens barrel 300 by allowing a force toward the imaging plane to act on, or be transferred to, the rearmost lens 280.

In the camera module 10 configured as described above, the coupling force between the lens barrel 300 and the rearmost lens 280 may be improved, and a phenomenon in which the rearmost lens 280 and the other lenses are separated from the lens barrel 300 due to an external impact may thus be remarkably reduced.

Additionally, in the camera module 10 according to the present example, a press-fit ring and an adhesive necessary to fix the rearmost lens 280 may be omitted, and a manufacturing process of the camera module 10 may thus be simplified.

A camera module, in accordance with one or more embodiments, will be described with reference to FIGS. 4 through 7.

A camera module 12 may include a first lens group 100, a second lens group 200, and a lens barrel 300. However, components of the camera module 12 are not limited to the components described above. In an example, the camera module 12 may further include an interval maintaining member 400, a filter (not illustrated), an image sensor (not illustrated), and the like. Additionally, the camera module 12 may further include a driving unit that drives the lens barrel 300 in an optical axis direction or a direction intersecting an optical axis.

The first lens group 100 may include one or more lenses. In an example, the first lens group 100 may include a foremost lens 110 disposed closest to an object. The foremost lens 110 may include an optical portion 112 and a flange portion 114. The optical portion 112 may be configured to exhibit optical performance, and the flange portion 114 may be configured to enable position alignment of the lenses. In an example, the optical portion 112 may be configured to have positive refractive power or negative refractive power, and the flange portion 114 may be configured to be in contact with a neighboring lens or the lens barrel 300. The optical portion 112 may be exposed outward of the lens barrel 300. In an example, the optical portion 112 may be partially or completely exposed through an opening 302 of the lens barrel 300. In contrast, the flange portion 114 may be configured so as not to be exposed through the opening 302 of the lens barrel 300.

The foremost lens 110 may be disposed at the innermost side of the lens barrel 300. The foremost lens 110 may be in contact with a plurality of different inner surfaces of a first accommodation space 310. In an example, an object-side surface of the flange portion 114 may be in contact with an upper surface 312 of the first accommodation space 310, and an outer peripheral surface of the flange portion 114 may be in contact with an inner surface 314 of the first accommodation space 310. Therefore, the foremost lens 110 may be mounted in the lens barrel 300, such that the foremost lens 110 may be aligned so that an optical axis thereof coincides with an optical axis C of the lens barrel 300.

The first lens group 100 may include a plurality of lenses. In an example, the first lens group 100 may further include one or more lenses, in addition to the foremost lens 110. For reference, the first lens group 100, according to the present example, may further include four lenses 120, 130, 140, and 150, in addition to the foremost lens 110. However, the number of lenses constituting the first lens group 100 is not limited to five. For example, depending on optical performance of the camera module 12, the number of lenses constituting the first lens group 100 may be less than five or may be five or more.

The lenses 110, 120, 130, 140, and 150 of the first lens group 100 may have diameters that become substantially larger from an object side toward an imaging plane. In an example, a second lens 120 may have a diameter greater than a diameter of a first lens 110 (the foremost lens), and a third lens 130 may have a diameter greater than a diameter of the second lens 120. However, positions and sizes of the lenses 110, 120, 130, 140, and 150 are not necessarily in proportion to each other. In an example, a fourth lens 140 and the third lens 130 may be formed to have substantially the same size. A lens disposed closest to the second lens group 200 among the lenses of the first lens group 100 may generally have the largest diameter. In the present example, a fifth lens 150 may have a diameter greater than diameters of the first to fourth lenses 110 to 140.

The second lens group 200 may include one or more lenses. In an example, the second lens group 200 may include a rearmost lens 280 disposed closest to the imaging plane. The rearmost lens 280 may include an optical portion 282 and a flange portion 284. The optical portion 282 may be configured to exhibit optical performance, and the flange portion 284 may be configured to enable position alignment of the lenses. In an example, the optical portion 282 may be configured to have positive refractive power or negative refractive power, and the flange portion 284 may be configured to be in contact with the lens barrel 300. An outer peripheral surface 2842 of the flange portion 284 may be configured to have an inclination with respect to the optical axis C. In an example, the outer peripheral surface 2842 of the flange portion 284 may be formed to have an inclination angle larger than 0° and smaller than 0.5° with respect to the optical axis C. Alternatively, the outer peripheral surface 2842 of the flange portion 284 may be formed to have substantially the same inclination as an inner peripheral surface 322 of a second accommodation space 320.

The lens barrel 300 may be configured to accommodate the first lens group 100 and the second lens group 200 therein. For example, the first accommodation space 310 and the second accommodation space 320 may be formed inside the lens barrel 300.

The first accommodation space 310 may be configured to accommodate the first lens group 100. In an example, the first accommodation space 310 may be formed to have a size enough to accommodate the lenses 110, 120, 130, 140, and 150 of the first lens group 100. A step 316 may be formed in the first accommodation space 310. In an example, a plurality of steps 316 that specify accommodation positions of the first to fifth lenses 110 to 150 may be formed in the first accommodation space 310. The steps 316 may be formed to have different sizes. In an example, the steps 316 may be formed to have sizes substantially coinciding with those of the first to fifth lenses 110 to 150.

The second accommodation space 320 may be configured to accommodate the second lens group 200. In an example, the second accommodation space 320 may be formed to accommodate the rearmost lens 280 of the second lens group 200. The second accommodation space 320 may be formed to become narrower from the object side toward the imaging plane. In an example, the second accommodation space 320 may have a first radius R1 having a maximum size at a first point P1 closest to the object and have a second radius R2 having a minimum size at a second point P2 closest to the imaging plane. Therefore, a cross-sectional area of the second accommodation space 320 may become smaller from the first point P1 toward the second point P2. That is, the inner peripheral surface 322 of the second accommodation space 320 connecting the first point P1 and the second point P2 to each other may be formed to have a first inclination angle with respect to the optical axis C.

The first inclination angle of the inner peripheral surface 322 may be larger than 0° and equal to or less than 1°. When the first inclination angle is 0° (that is, in an example where the inner circumferential surface 322 of the second accommodation space 320 is parallel to the optical axis C), it may be difficult to expect a separation force prevention effect of the rearmost lens 280 by the second accommodation space 320, and when the first inclination angle exceeds 1°, it may be difficult to fit the rearmost lens 280 into the second accommodation space 320. Therefore, the first inclination angle of the inner peripheral surface 322 may be limited to be within the range described above. However, the numerical range of the first inclination angle described above may be limited to an example where the outer peripheral surface 2842 of the rearmost lens 280 is substantially parallel to the optical axis C. Therefore, in an example where the outer peripheral surface 2842 of the rearmost lens 280 has a predetermined inclination with respect to the optical axis C, the range of the first inclination angle may be changed.

The second accommodation space 320 may be configured so as not to interfere with the mounting of the first lens group 100. In an example, the second radius R2 of the second accommodation space 320 may be larger than a maximum radius L5R of the fifth lens 150 having a maximum size in the first lens group 100.

Figure 5:
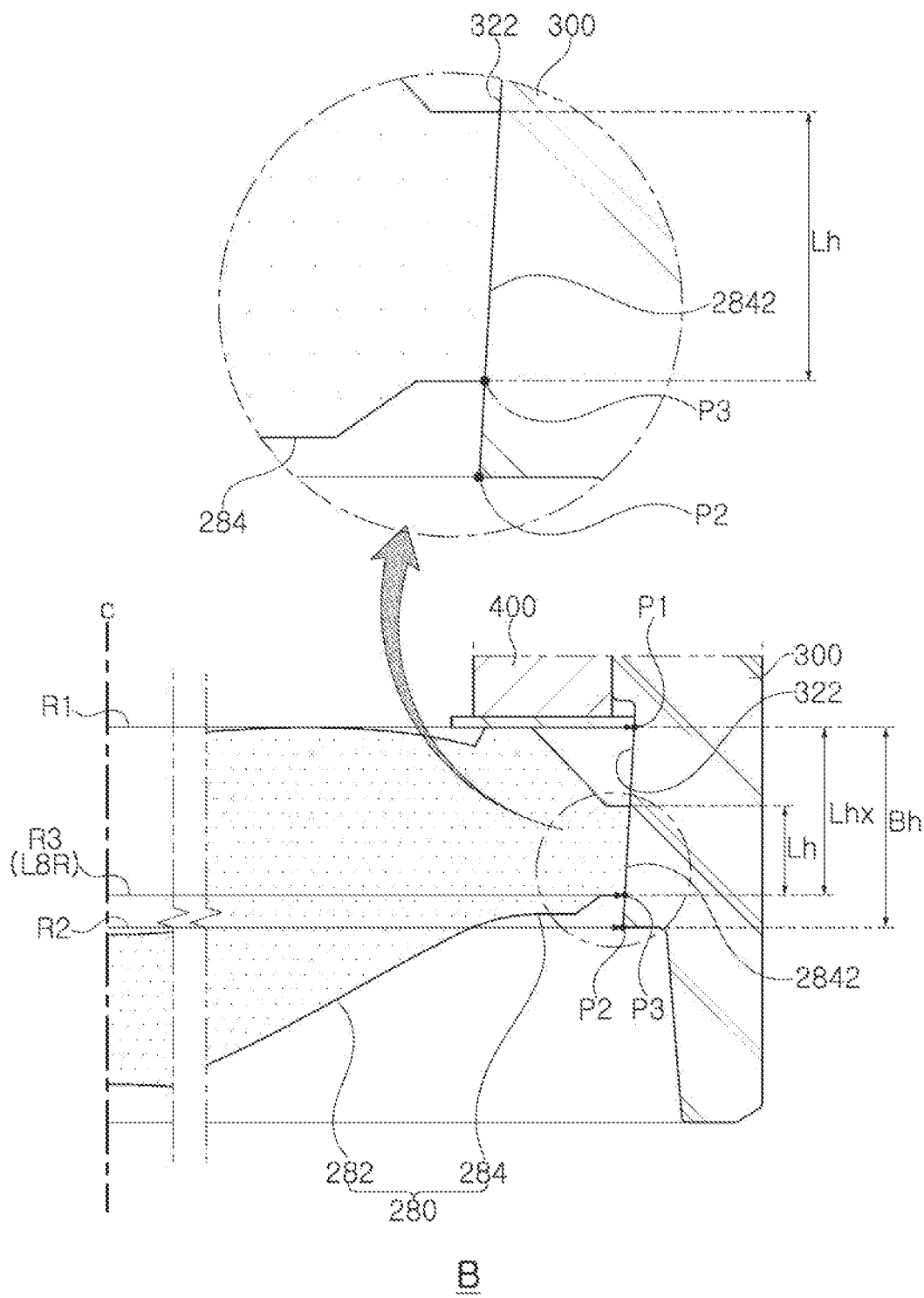
FIGS. 5 and 6 are enlarged views of part B illustrated in FIG. 4.
Figure 6:
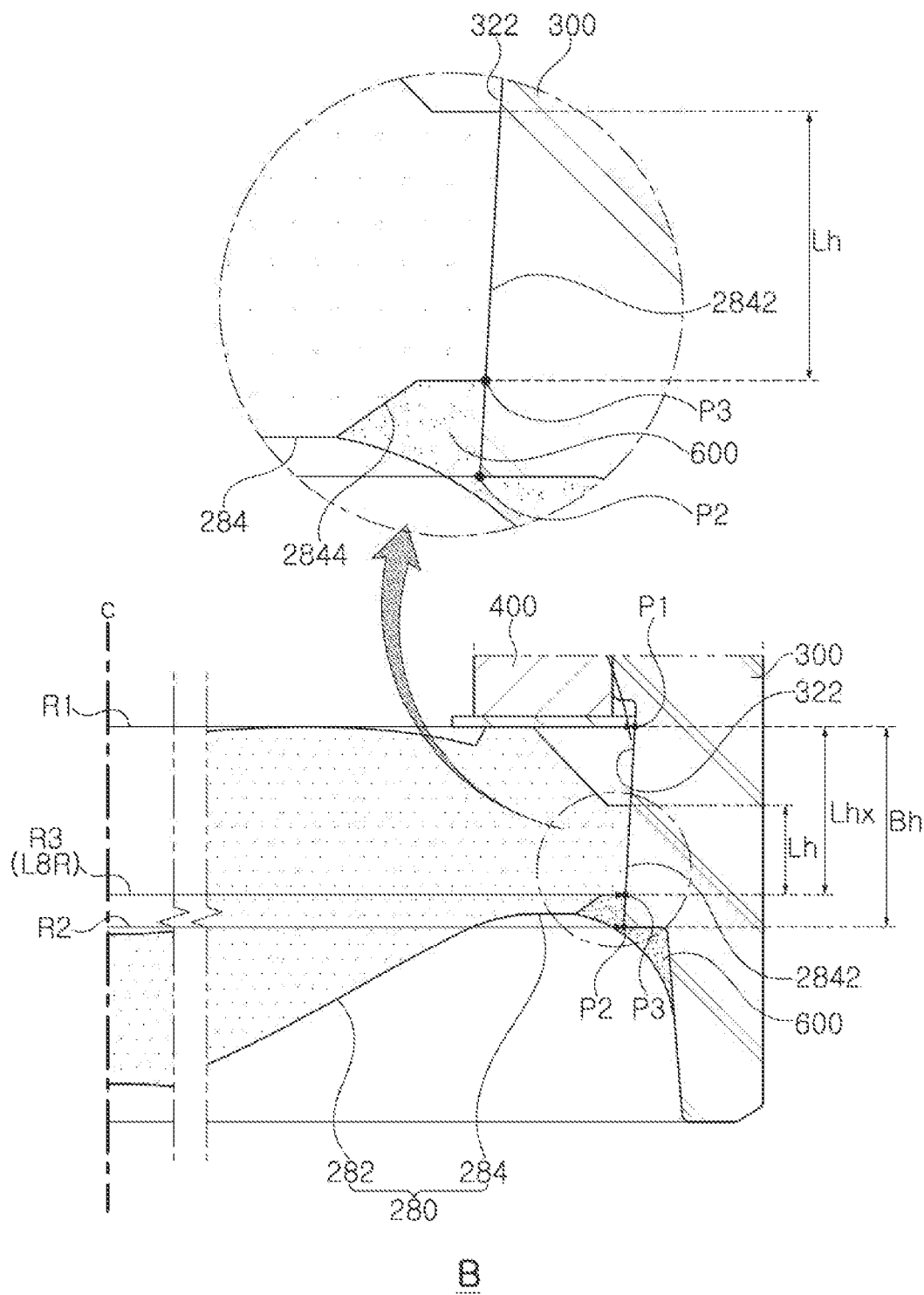
Figure 7:
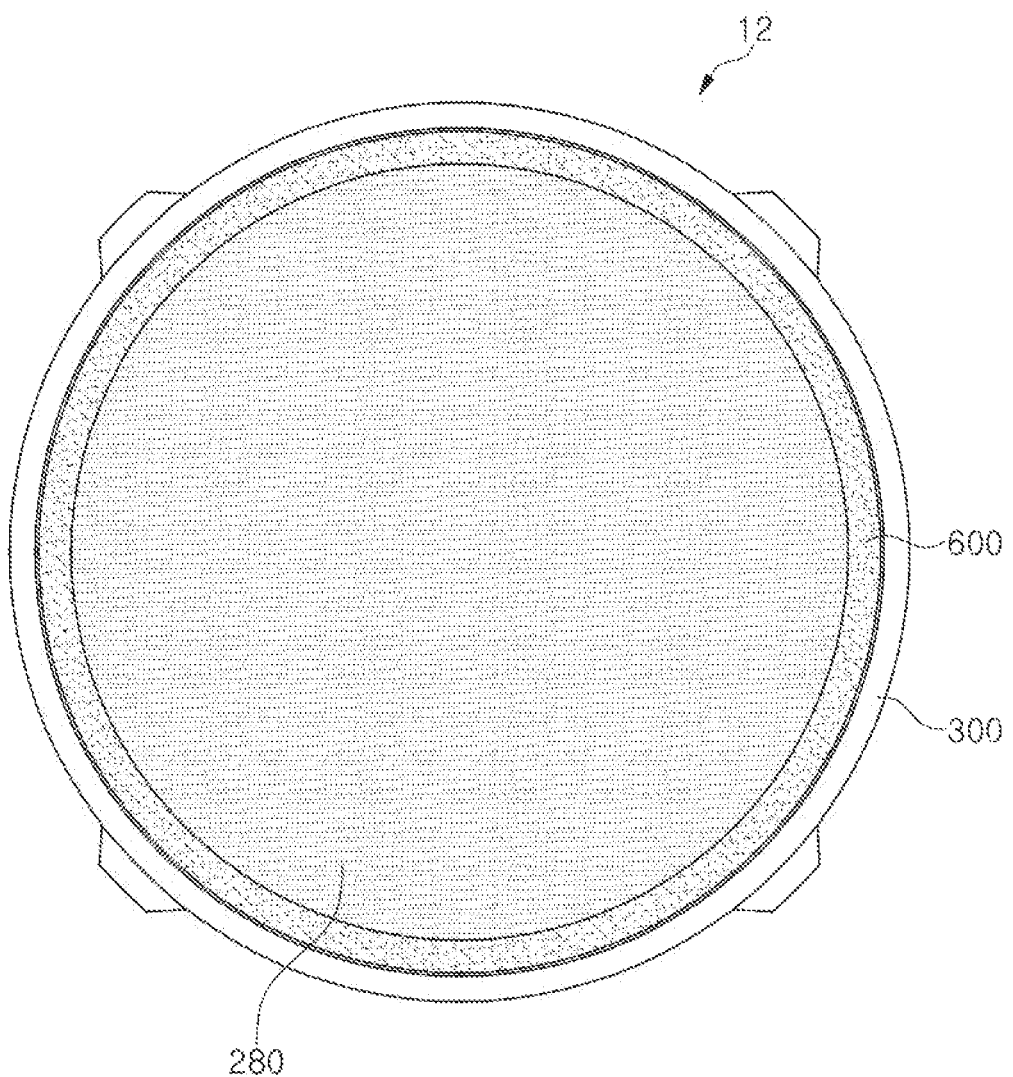
FIG. 7 is a bottom view of the example camera module illustrated in FIG. 6.
Figure 8:
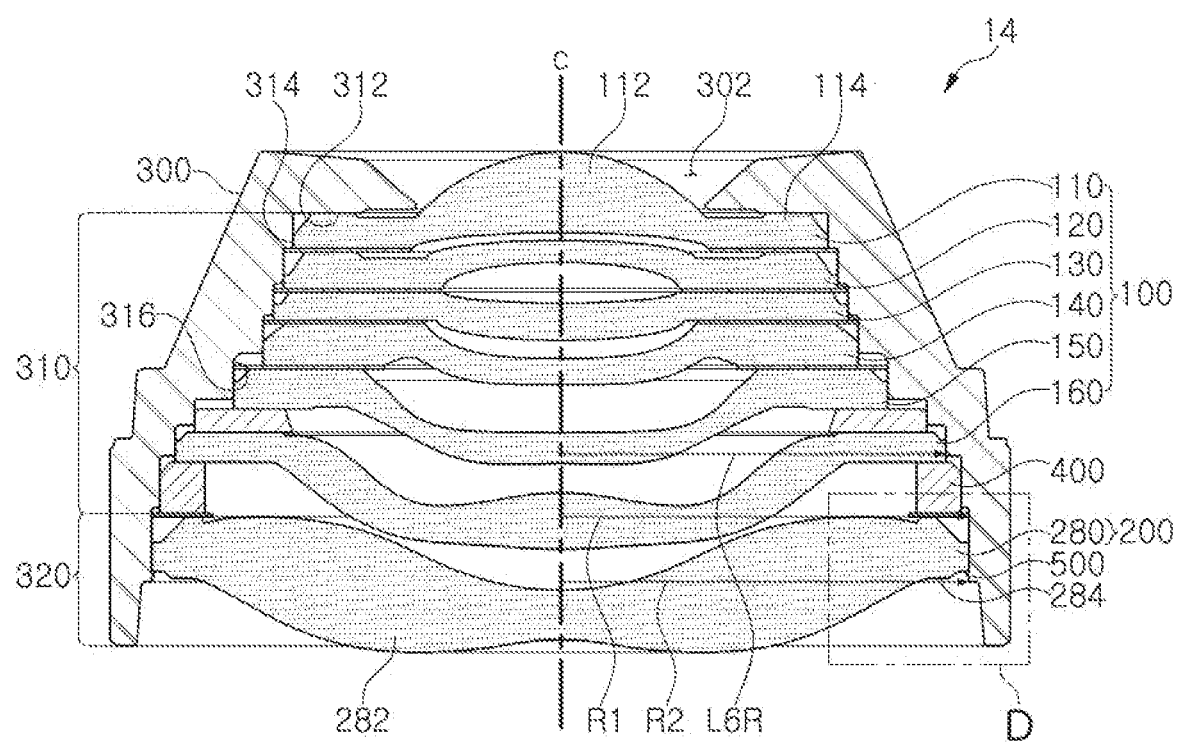
FIG. 8 is a cross-sectional view of an example camera module, in accordance with one or more embodiments.
Figure 9:
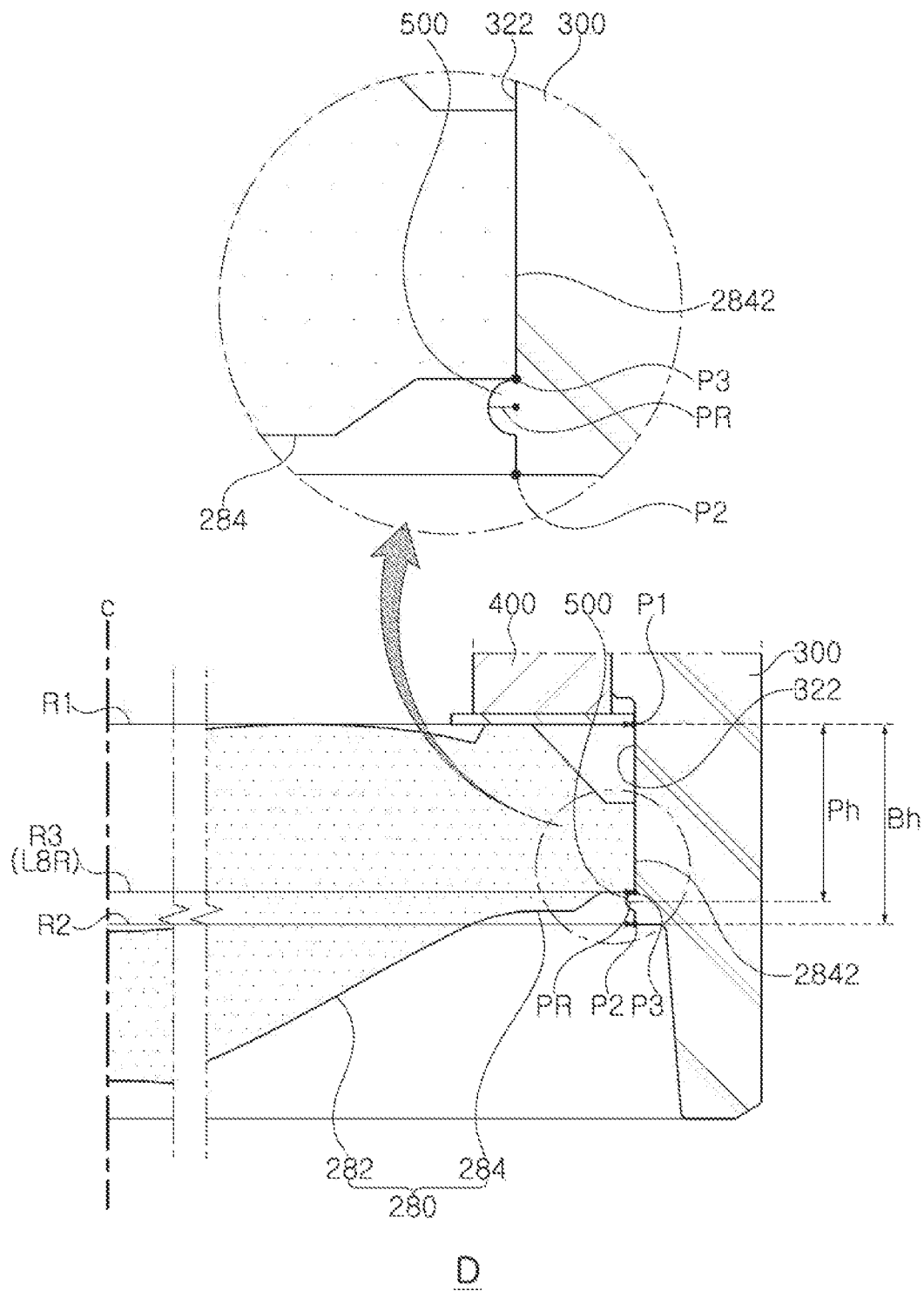
FIG. 9 is an enlarged view of part D illustrated in FIG. 8.
Figure 10:
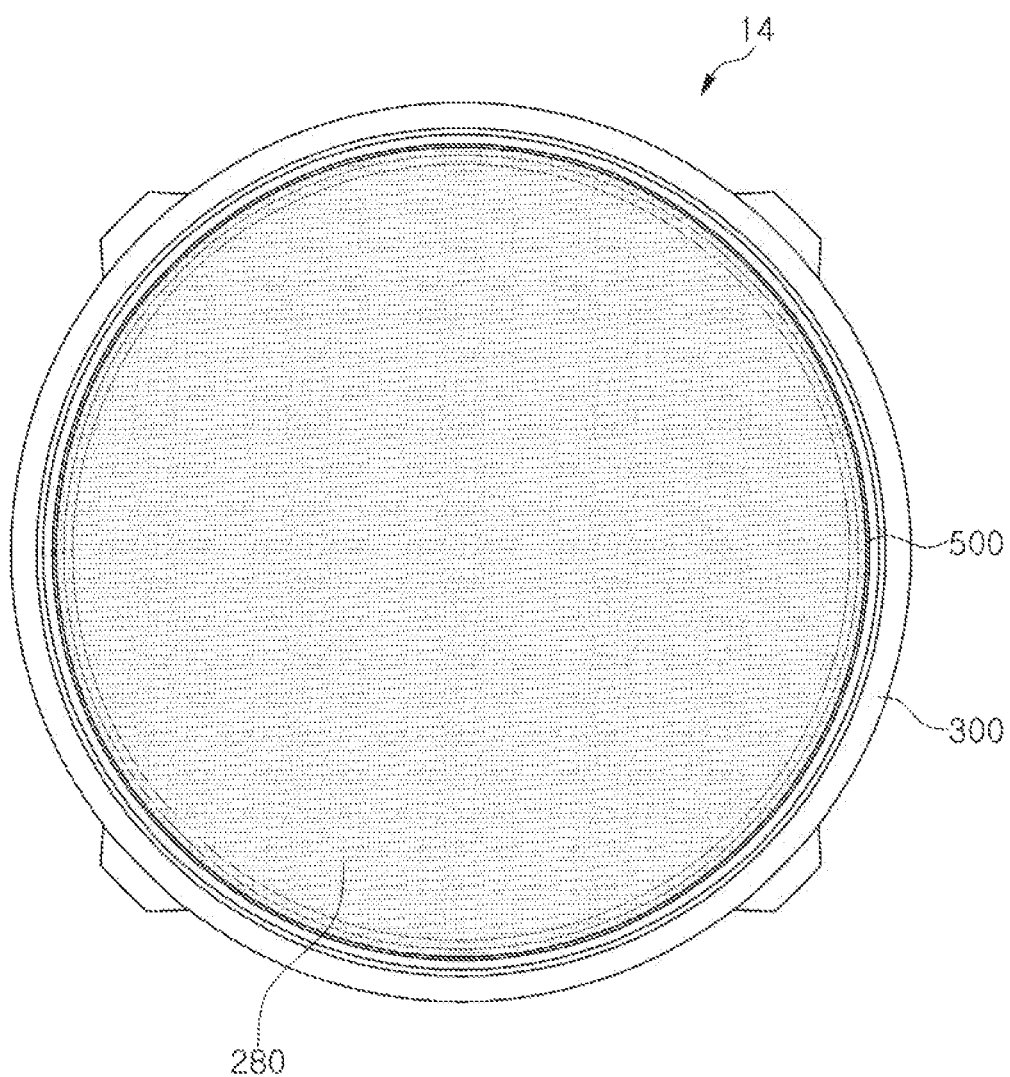
FIGS. 10 and 11 are bottom views of the example camera module illustrated in FIG. 8.

The second accommodation space 320 may be configured to block or reduce a phenomenon in which the rearmost lens 280 is separated from the lens barrel 300. As an example, the second radius R2 of the second accommodation space 320 may be smaller than a minimum radius L8R of the rearmost lens 280. As another example, a third radius R3 at a third point P3 in contact with a lower end of the rearmost lens 280 in the second accommodation space 320 may be equal to or smaller than a minimum radius L8R of the rearmost lens 280. Therefore, the rearmost lens 280 may be coupled to the inner peripheral surface 322 of the second accommodation space 320 only in a press-fitting manner. Additionally, the outer peripheral surface 2842 of the rearmost lens 280 may be compressed by the inner peripheral surface 322 of the lens barrel 300 to be deformed to have the same inclination as the inner peripheral surface 322, as illustrated in FIG. 5. The press-fitting coupling and frictional coupling between the second accommodation space 320 and the rearmost lens 280 may be uniformly performed along a peripheral direction of the rearmost lens 280 as illustrated in FIG. 7.

The second accommodation space 320 may have a size enough to accommodate the rearmost lens 280. In an example, a length Bh of the second accommodation space 320 may be larger than a distance Lhx from a contact point between the rearmost lens 280 and a front member to a point at which the flange portion 284 and the inner peripheral surface of the second accommodation space 320 are in contact with each other. An excess length (Bh−Lhx) of the second accommodation space 320 may play a large role in preventing the separation of the rearmost lens 280. In an example, a separation prevention effect of the rearmost lens 280 due to a coupling force between the lens barrel 300 and the rearmost lens 280 or the second accommodation space 320 may become large in proportion to the excess length (Bh−Lhx) of the second accommodation space 320. The excess length (Bh−Lhx) of the second accommodation space 320 may be increased or decreased according to the number of lenses accommodated in the lens barrel 300 or a total weight of the lenses. In an example where a number of lenses less than five lenses are accommodated in the lens barrel 300, the excess length (Bh−Lhx) may be decreased, and in an example where five or more lenses are accommodated in the lens barrel 300, the excess length (Bh−Lhx) may be increased.

The camera module 12 may further include the interval maintaining member 400. The interval maintaining member 400 may be disposed between the first lens group 100 and the second lens group 200. In an example, the interval maintaining member 400 may be disposed between the fifth lens 150 and the rearmost lens 280. The interval maintaining member 400 may maintain a constant distance between the fifth lens 150 and the rearmost lens 280 in the optical axis direction. Additionally, the interval maintaining member 400 may increase the coupling force between the rearmost lens 280 and the lens barrel 300 by allowing a force toward the imaging plane to act on or be transferred to the rearmost lens 280.

The camera module 12 may further include an adhesive member 600 so as to make coupling between the rearmost lens 280 and the lens barrel 300 firmer. The adhesive member 600 may be applied between an image-side surface of the rearmost lens 280 and an inner peripheral surface of the lens barrel 300. A groove 2844 that accommodates the adhesive member 600 may be formed in the flange portion 284 of the rearmost lens 280. The groove 2844 formed in the flange portion 284 may increase a contact area between the adhesive member 600 and the rearmost lens 280. The groove 2844 may be formed in a circular shape along a peripheral direction of the flange portion 284 or the grooves 2844 may be partially formed at predetermined intervals along the peripheral direction of the flange portion 284.

In the camera module 12 configured as described above, the coupling force between the lens barrel 300 and the rearmost lens 280 may be improved, and a phenomenon in which the rearmost lens 280 and the other lenses are separated from the lens barrel 300 due to an external impact may thus be remarkably reduced.

In particular, in the camera module 12 according to the present example, the outer peripheral surface 2842 of the rearmost lens 280 and the inner peripheral surface 322 of the lens barrel 300 may be formed to have substantially the same or similar inclination, and the outer peripheral surface 2842 and the inner peripheral surface 322 may thus be in surface-contact with each other. Therefore, in the camera module 12 according to the present example, the coupling force between the rearmost lens 280 and the lens barrel 300 may further be improved. Additionally, in the camera module 12 according to the present example, a delamination phenomenon of the rearmost lens 280 may be reduced through the surface contact between the outer peripheral surface 2842 and the inner peripheral surface 322.

A camera module, in accordance with one or more embodiments, will be described with reference to FIGS. 8 through 11.

A camera module 14 may include a first lens group 100, a second lens group 200, and a lens barrel 300. However, components of the camera module 14 are not limited to the components described above. In an example, the camera module 14 may further include an interval maintaining member 400, a filter (not illustrated), an image sensor (not illustrated), and the like. Additionally, the camera module 14 may further include a driving unit that drives the lens barrel 300 in an optical axis direction or a direction intersecting an optical axis.

The first lens group 100 may include one or more lenses. In an example, the first lens group 100 may include a foremost lens 110 disposed closest to an object. The foremost lens 110 may include an optical portion 112 and a flange portion 114. The optical portion 112 may be configured to exhibit optical performance, and the flange portion 114 may be configured to enable position alignment of the lenses. In an example, the optical portion 112 may be configured to have positive refractive power or negative refractive power, and the flange portion 114 may be configured to be in contact with a neighboring lens or the lens barrel 300. The optical portion 112 may be exposed outward of the lens barrel 300. In an example, the optical portion 112 may be partially or completely exposed through an opening 302 of the lens barrel 300. In contrast, the flange portion 114 may be configured so as not to be exposed through the opening 302 of the lens barrel 300.

The foremost lens 110 may be disposed at the innermost side of the lens barrel 300. The foremost lens 110 may be in contact with a plurality of different inner surfaces of a first accommodation space 310. In an example, an object-side surface of the flange portion 114 is in contact with an upper surface 312 of the first accommodation space 310, and an outer peripheral surface of the flange portion 114 may be in contact with an inner surface 314 of the first accommodation space 310. Therefore, the foremost lens 110 may be mounted in the lens barrel 300, such that the foremost lens 110 may be aligned so that an optical axis thereof coincides with an optical axis C of the lens barrel 300.

The first lens group 100 may include a plurality of lenses. In an example, the first lens group 100 may further include one or more lenses, in addition to the foremost lens 110. For reference, the first lens group 100 according to the present example may further include five lenses 120, 130, 140, 150, and 160, in addition to the foremost lens 110. However, the number of lenses constituting the first lens group 100 is not limited to six. For example, depending on optical performance of the camera module 14, the number of lenses constituting the first lens group 100 may be less than six or may be six or more.

The lenses 110, 120, 130, 140, 150, and 160 of the first lens group 100 may have diameters that become substantially larger from an object side toward an imaging plane. For example, a second lens 120 may have a diameter greater than a diameter of a first lens 110 (the foremost lens), and a third lens 130 may have a diameter greater than a diameter of the second lens 120. However, positions and sizes of the lenses 110, 120, 130, 140, 150, and 160 are not necessarily in proportion to each other. In an example, a fourth lens 140 and the third lens 130 may be formed to have substantially the same size. A lens disposed closest to the second lens group 200 among the lenses of the first lens group 100 may generally have the largest diameter. In an example, a sixth lens 160 may have a diameter greater than diameters of the first to fifth lenses 110 to 150.

The second lens group 200 may include one or more lenses. In an example, the second lens group 200 may include a rearmost lens 280 disposed closest to the imaging plane. The rearmost lens 280 may include an optical portion 282 and a flange portion 284. The optical portion 282 may be configured to exhibit optical performance, and the flange portion 284 may be configured to enable position alignment of the lenses. In an example, the optical portion 282 may be configured to have positive refractive power or negative refractive power, and the flange portion 284 may be configured to be in contact with the lens barrel 300. An outer peripheral surface 2842 of the flange portion 284 may be configured to be substantially parallel to the optical axis C.

The lens barrel 300 may be configured to accommodate the first lens group 100 and the second lens group 200 therein. In an example, the first accommodation space 310 and a second accommodation space 320 may be formed inside the lens barrel 300.

The first accommodation space 310 may be configured to accommodate the first lens group 100. In an example, the first accommodation space 310 may be formed to have a size enough to accommodate the lenses 110, 120, 130, 140, 150, and 160 of the first lens group 100. A step 316 may be formed in the first accommodation space 310. In an example, a plurality of steps 316 that specify accommodation positions of the first to sixth lenses 110 to 160 may be formed in the first accommodation space 310. The steps 316 may be formed to have different sizes. In an example, the steps 316 may be formed to have sizes substantially coinciding with sizes of the first to sixth lenses 110 to 160.

The second accommodation space 320 may be configured to accommodate the second lens group 200. In an example, the second accommodation space 320 may be formed to accommodate the rearmost lens 280 of the second lens group 200. An inner peripheral surface 322 of the second accommodation space 320 may be formed to be substantially parallel to the optical axis C. However, the inner peripheral surface 322 of the second accommodation space 320 is not necessarily formed to be parallel to the optical axis (C). In an example, the inner peripheral surface 322 of the second accommodation space 320 may be formed to have a predetermined inclination with respect to the optical axis C.

The second accommodation space 320 may be configured to significantly reduce movement of the rearmost lens 280. In an example, a radius R of the inner peripheral surface 322 of the second accommodation space 320 may be substantially the same as a radius L8R of the rearmost lens 280 or may be slightly larger than the radius L8R of the rearmost lens 280. For reference, a deviation between the radius R of the inner peripheral surface 322 and the radius L8R of the rearmost lens 280 may not be out of a range of 0 to 3 μm.

Figure 11:
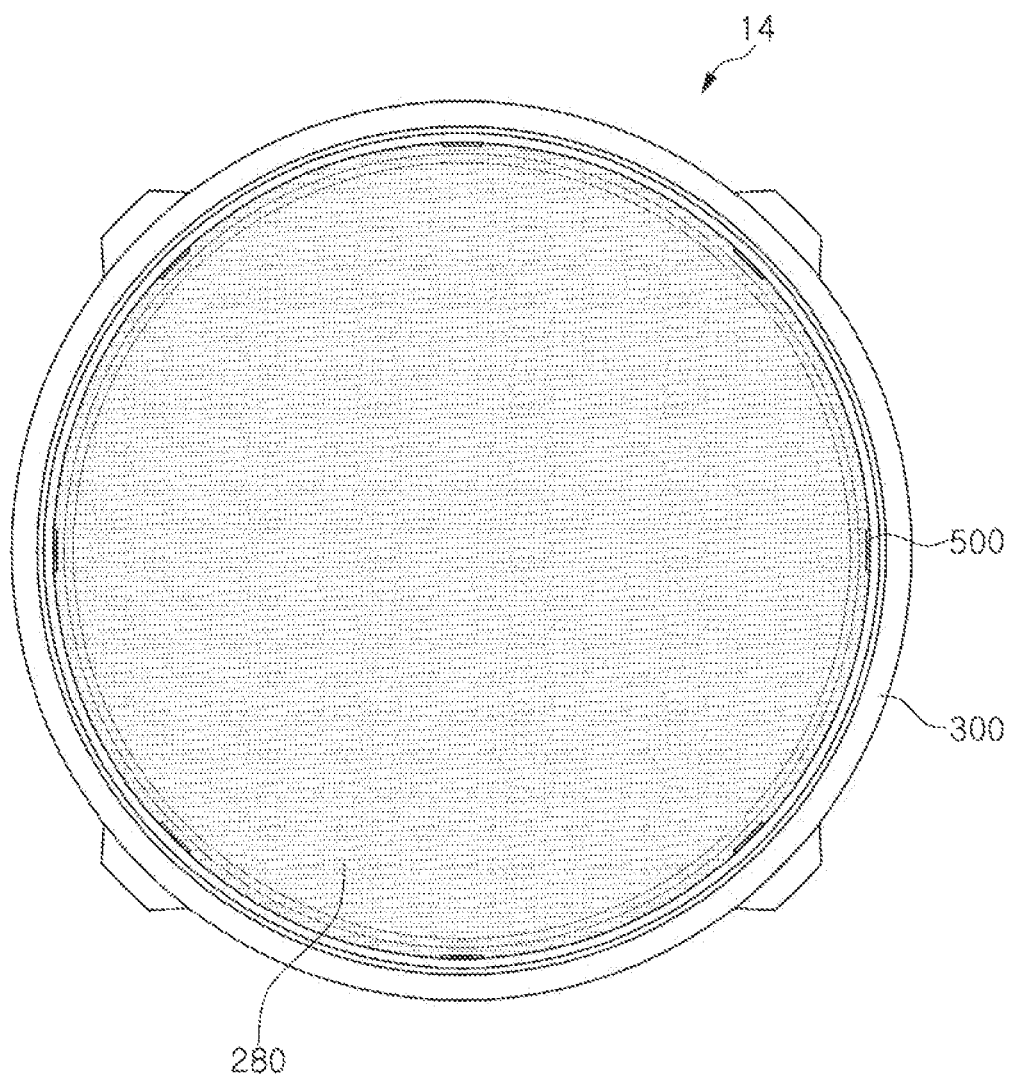
Figure 12:
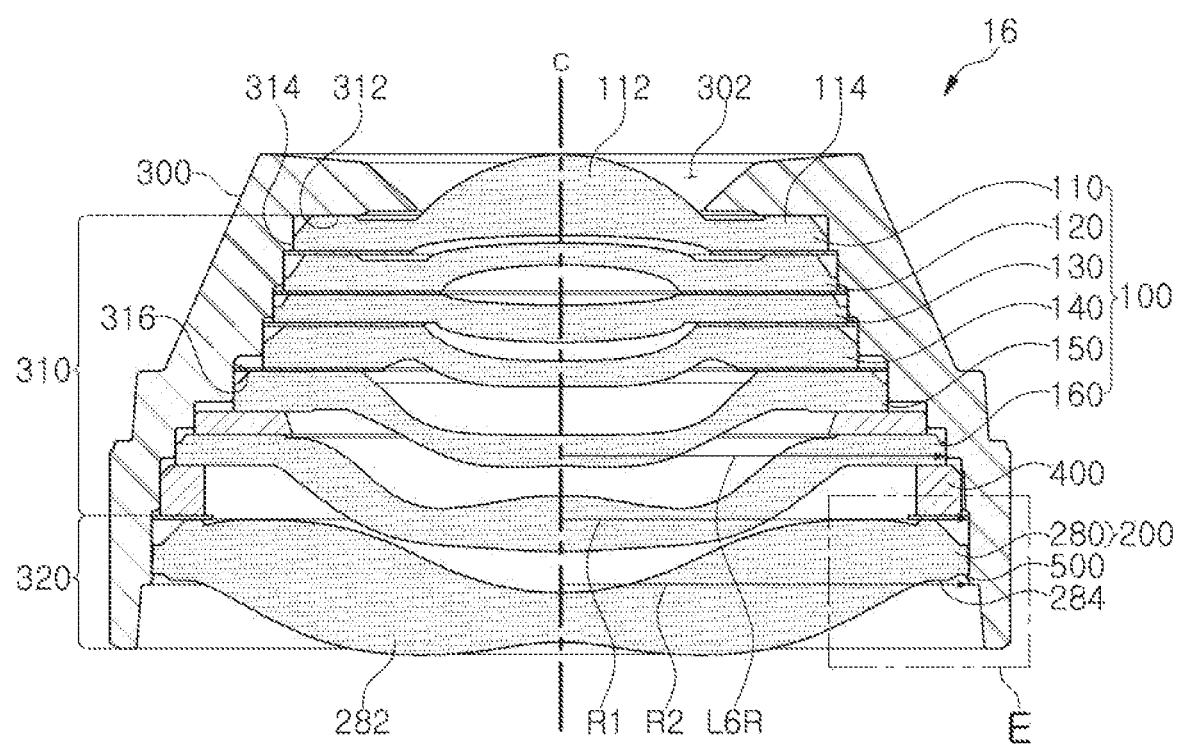
FIG. 12 is a cross-sectional view of an example camera module, in accordance with one or more embodiments.
Figure 13:
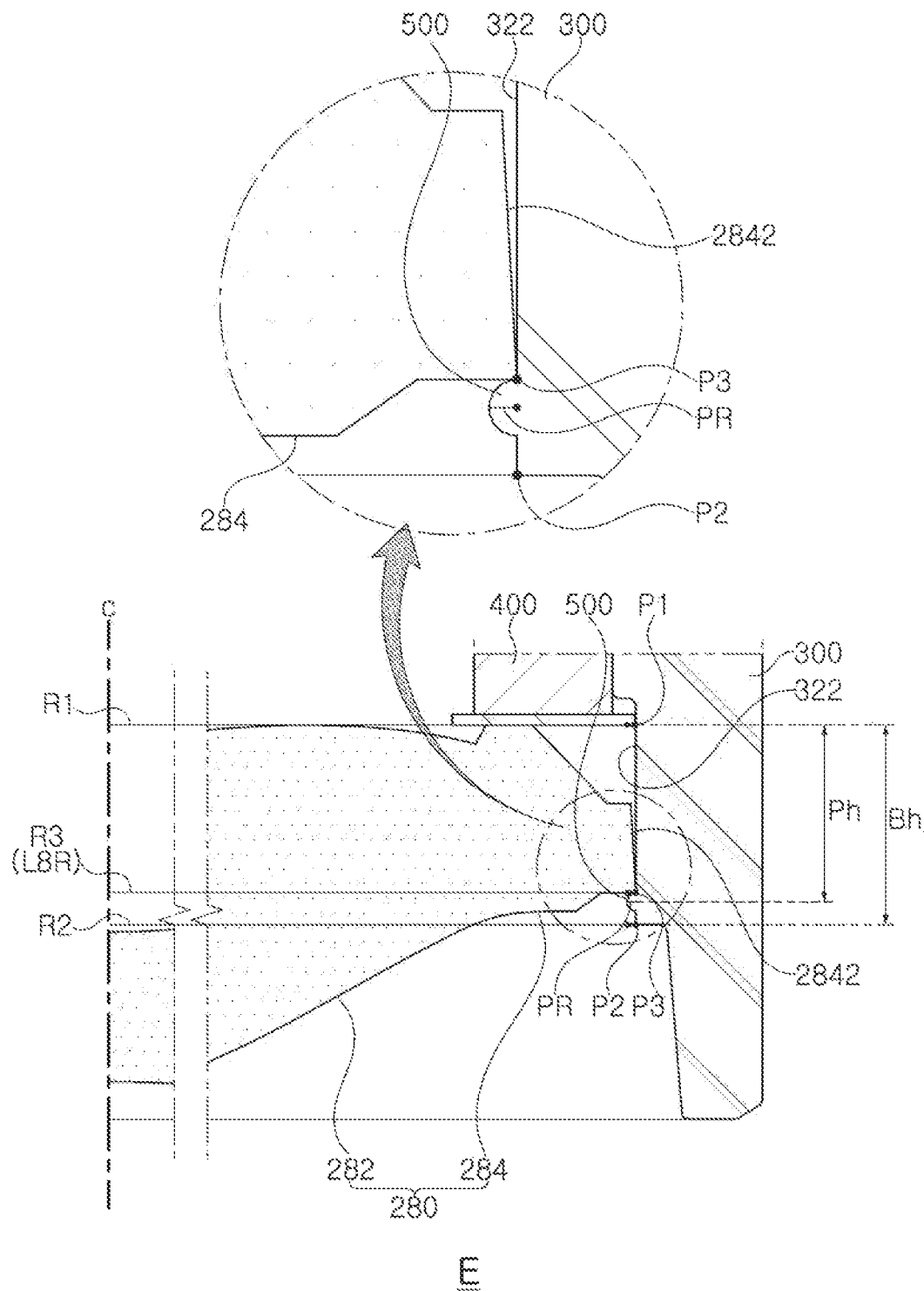
FIGS. 13 and 14 are enlarged views of part E illustrated in FIG. 12.
Figure 14:
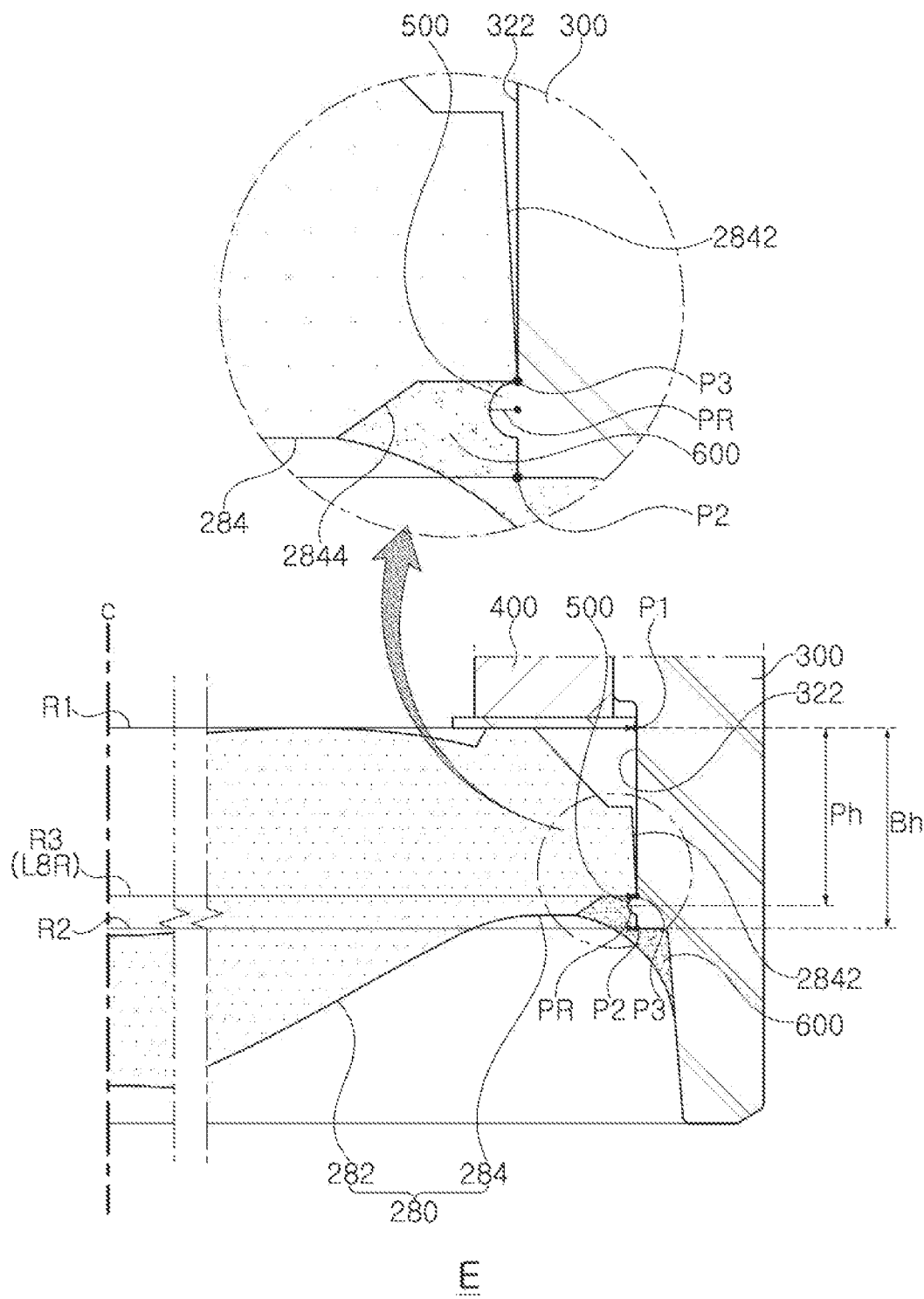
Figure 15:
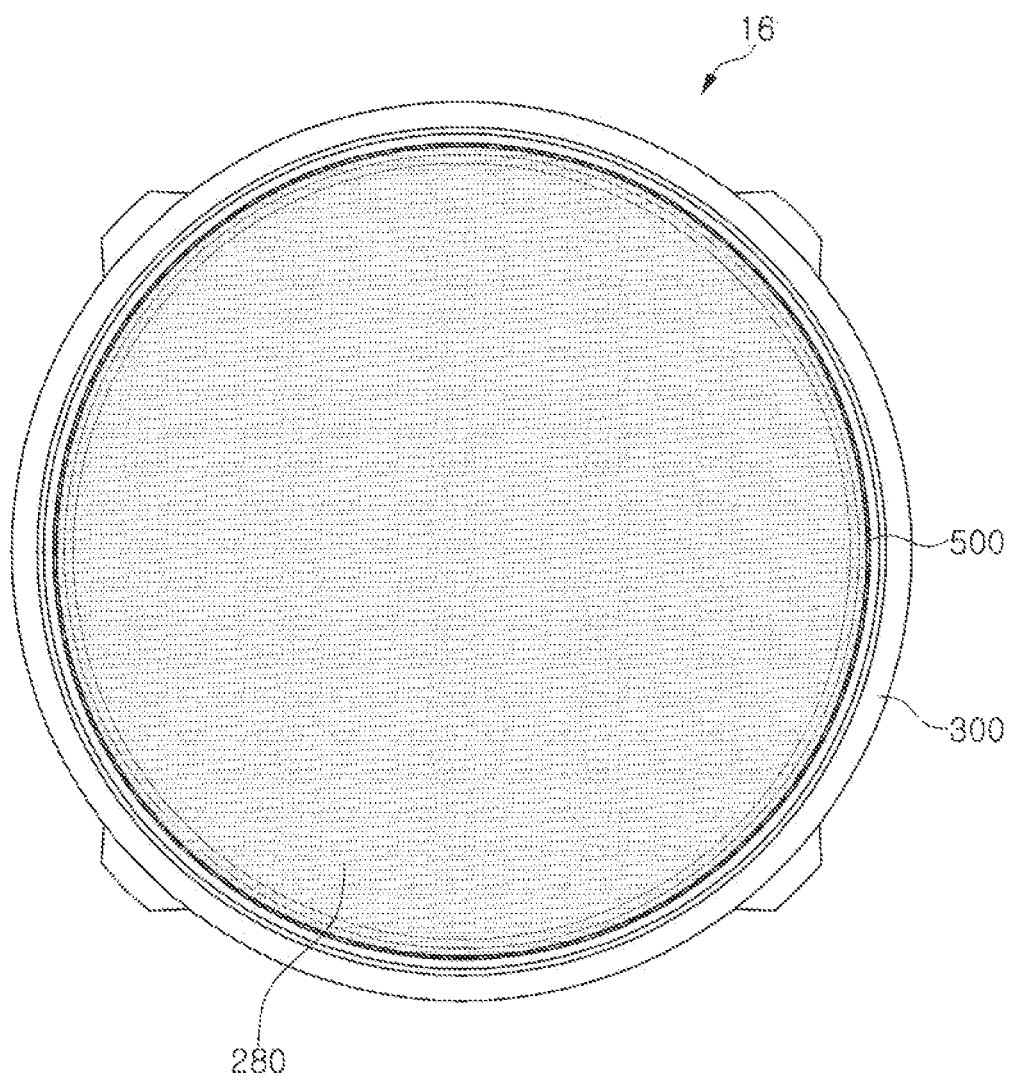
FIGS. 15 and 16 are bottom views of the camera module illustrated in FIG. 12.

The second accommodation space 320 may be formed to prevent separation of the rearmost lens 280. In an example, one or more protrusions 500 may be formed on the inner peripheral surface 322 of the second accommodation space 320. A cross-sectional shape of the one or more protrusions 500 may be generally a semicircular shape. However, the cross-sectional shape of the one or more protrusions 500 is not limited to the semicircular shape. In an example, a cross section of the one or more protrusions 500 may be formed in an arc shape having a curved surface. The one or more protrusions 500 may be formed in a circular shape along the inner peripheral surface 322 of the second accommodation space 320. However, as illustrated in FIG. 11, the protrusions 500 may also be formed at predetermined intervals along the inner peripheral surface 322.

The second accommodation space 320 may have a size enough to accommodate the rearmost lens 280. In an example, a length Bh of the second accommodation space 320 may be larger than a distance Lhx from a contact point between the rearmost lens 280 and a front member to a point at which the flange portion 284 and the inner peripheral surface 322 of the second accommodation space 320 are in contact with each other.

The one or more protrusions 500 may be formed at a point at which the separation of the rearmost lens 280 may be prevented and a coupling force between the rearmost lens 280 and the lens barrel 300 may be significantly increased. As an example, a distance Ph from a start point of the second accommodation space 320 or the contact point between the rearmost lens 280 and the front member to the center of the one or more protrusions 500 may be larger than Lhx. As another example, a value (Ph−PR) obtained by subtracting a radius PR of the one or more protrusions 500 from Ph may be equal to or larger than Lhx. The one or more protrusions 500 formed as above may support an image-side surface of the rearmost lens 280 to reduce a phenomenon in which the rearmost lens 280 is separated toward the imaging plane, and serve to push up the rearmost lens 280 toward the object side.

The camera module 14 may further include the interval maintaining member 400. The interval maintaining member 400 may be disposed between the first lens group 100 and the second lens group 200. In an example, the interval maintaining member 400 may be disposed between the sixth lens 160 and the rearmost lens 280. The interval maintaining member 400 may maintain a constant distance between the sixth lens 160 and the rearmost lens 280 in the optical axis direction. Additionally, the interval maintaining member 400 may increase the coupling force between the rearmost lens 280 and the lens barrel 300 by allowing a force toward the imaging plane to act on or be transferred to the rearmost lens 280.

In the camera module 14 configured as described above, coupling force between the lens barrel 300 and the rearmost lens 280 may be improved, and a phenomenon in which the rearmost lens 280 and the other lenses are separated from the lens barrel 300 due to external impacts may thus be remarkably reduced.

Additionally, in the camera module 14 according to the present example, the rearmost lens 280 may be pushed up toward the object side through the one or more protrusions 500 having the semicircular shape to prevent an unnecessary space from being formed between the first lens group 100 and the second lens group 200.

A camera module, in accordance with one or more embodiments, will be described with reference to FIGS. 12 through 16.

A camera module 16 may include a first lens group 100, a second lens group 200, and a lens barrel 300. However, components of the camera module 16 are not limited to the components described above. In an example, the camera module 16 may further include an interval maintaining member 400, a filter (not illustrated), an image sensor (not illustrated), and the like. Additionally, the camera module 16 may further include a driving unit that drives the lens barrel 300 in an optical axis direction or a direction intersecting an optical axis.

The first lens group 100 may include one or more lenses. In an example, the first lens group 100 may include a foremost lens 110 disposed closest to an object. The foremost lens 110 may include an optical portion 112 and a flange portion 114. The optical portion 112 may be configured to exhibit optical performance, and the flange portion 114 may be configured to enable position alignment of the lenses. In an example, the optical portion 112 may be configured to have positive refractive power or negative refractive power, and the flange portion 114 may be configured to be in contact with a neighboring lens or the lens barrel 300. The optical portion 112 may be exposed outward of the lens barrel 300. In an example, the optical portion 112 may be partially or completely exposed through an opening 302 of the lens barrel 300. In contrast, the flange portion 114 may be configured so as not to be exposed through the opening 302 of the lens barrel 300.

The foremost lens 110 may be disposed at the innermost side of the lens barrel 300. The foremost lens 110 may be in contact with a plurality of different inner surfaces of a first accommodation space 310. In an example, an object-side surface of the flange portion 114 may be in contact with an upper surface 312 of the first accommodation space 310, and an outer peripheral surface of the flange portion 114 may be in contact with an inner surface 314 of the first accommodation space 310. Therefore, the foremost lens 110 may be mounted in the lens barrel 300, such that the foremost lens 110 may be aligned so that an optical axis thereof coincides with an optical axis C of the lens barrel 300.

The first lens group 100 may include a plurality of lenses. In an example, the first lens group 100 may further include one or more lenses, in addition to the foremost lens 110. For reference, the first lens group 100 according to the present example may further include five lenses 120, 130, 140, 150, and 160, in addition to the foremost lens 110. However, the number of lenses constituting the first lens group 100 is not limited to six. For example, depending on optical performance of the camera module 16, the number of lenses constituting the first lens group 100 may be less than six or may be six or more.

The lenses 110, 120, 130, 140, 150, and 160 of the first lens group 100 may have diameters that become substantially larger from an object side toward an imaging plane. In an example, a second lens 120 may have a diameter greater than a diameter of a first lens 110 (the foremost lens), and a third lens 130 may have a diameter greater than diameters of the second lens 120. However, positions and sizes of the lenses 110, 120, 130, 140, 150, and 160 are not necessarily in proportion with each other. In an example, a fourth lens 140 and the third lens 130 may be formed to have substantially the same size. A lens disposed closest to the second lens group 200 among the lenses of the first lens group 100 may generally have the largest diameter. In an example, a sixth lens 160 may have a diameter greater than diameters of the first to fifth lenses 110 to 150.

The second lens group 200 may include one or more lenses. In an example, the second lens group 200 may include a rearmost lens 280 disposed closest to the imaging plane. The rearmost lens 280 may include an optical portion 282 and a flange portion 284. The optical portion 282 may be configured to exhibit optical performance, and the flange portion 284 may be configured to enable position alignment of the lenses. In an example, the optical portion 282 may be configured to have positive refractive power or negative refractive power, and the flange portion 284 may be configured to be in contact with the lens barrel 300. An outer peripheral surface 2842 of the flange portion 284 may be configured to have a predetermined inclination with respect to the optical axis C. In an example, the outer peripheral surface 2842 may be formed to have an inclination larger than 0° and smaller than 0.5° with respect to the optical axis C. The rearmost lens 280 configured as described above may be easily fitted into the lens barrel 300 because a cross-sectional area of the flange portion 284 becomes smaller toward the object side.

The lens barrel 300 may be configured to accommodate the first lens group 100 and the second lens group 200 therein. In an example, the first accommodation space 310 and a second accommodation space 320 may be formed inside the lens barrel 300.

The first accommodation space 310 may be configured to accommodate the first lens group 100. In an example, the first accommodation space 310 may be formed to have a size enough to accommodate the lenses 110, 120, 130, 140, 150, and 160 of the first lens group 100. A step 316 may be formed in the first accommodation space 310. For example, a plurality of steps 316 that specify accommodation positions of the first to sixth lenses 110 to 160 may be formed in the first accommodation space 310. The steps 316 may be formed to have different sizes. In an example, the steps 316 may be formed to have sizes substantially coinciding with those of the first to sixth lenses 110 to 160.

The second accommodation space 320 may be configured to accommodate the second lens group 200. In an example, the second accommodation space 320 may be formed to accommodate the rearmost lens 280 of the second lens group 200. An inner peripheral surface 322 of the second accommodation space 320 may be formed to be substantially parallel to the optical axis C.

The second accommodation space 320 may be configured to significantly reduce movement of the rearmost lens 280. In an example, a radius R of the inner peripheral surface 322 of the second accommodation space 320 may be substantially the same as a radius L8R of the rearmost lens 280 or may be slightly larger than the radius L8R of the rearmost lens 280. For reference, a deviation between the radius R of the inner peripheral surface 322 and the radius L8R of the rearmost lens 280 may not be out of a range of 0 to 3 μm.

Figure 16:
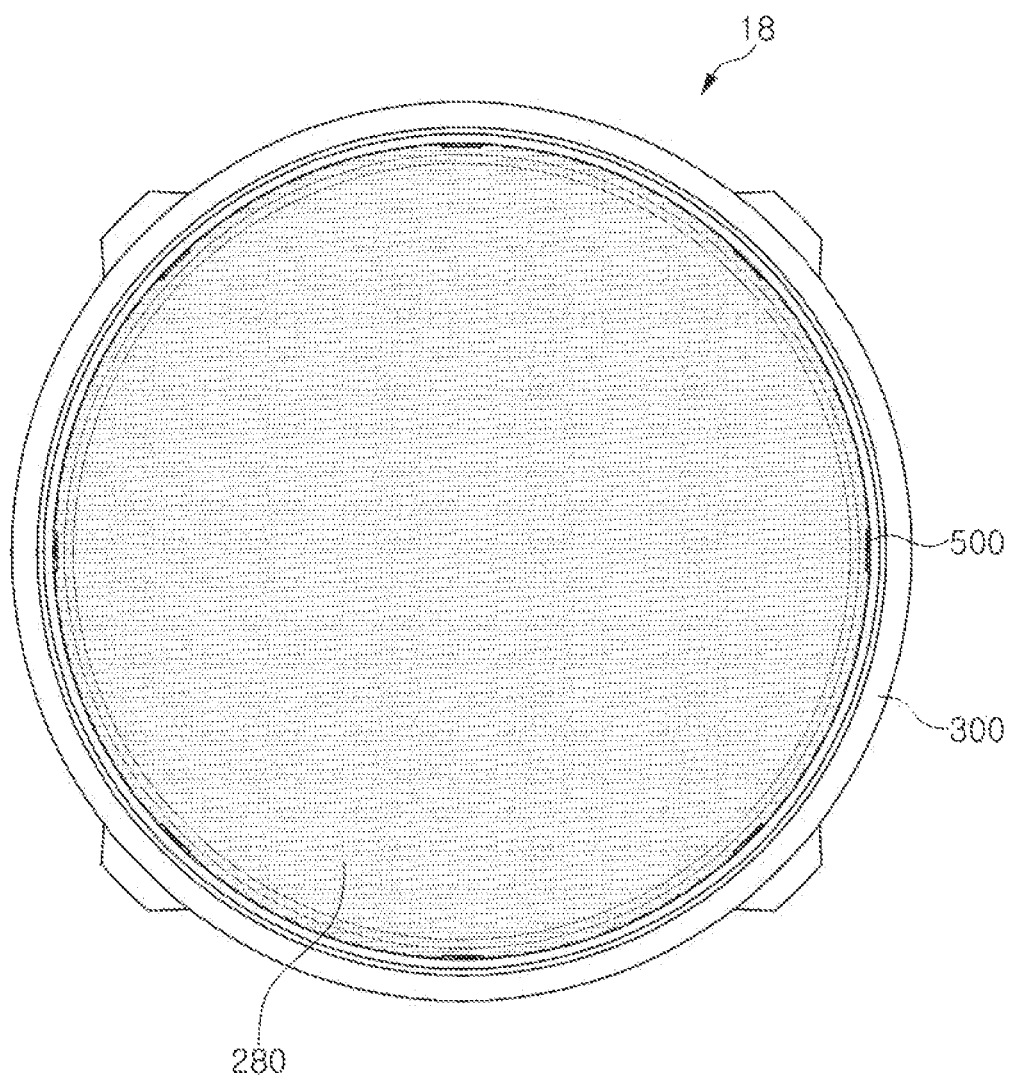

The second accommodation space 320 may be formed to prevent separation of the rearmost lens 280. For example, one or more protrusions 500 may be formed on the inner peripheral surface 322 of the second accommodation space 320. A cross-sectional shape of the one or more protrusions 500 may be generally a semicircular shape. However, the cross-sectional shape of the one or more protrusions 500 is not limited to the semicircular shape. In an example, a cross section of the one or more protrusions 500 may be formed in an arc shape having a curved surface. The one or more protrusions 500 may be formed in a circular shape along the inner peripheral surface 322 of the second accommodation space 320. However, as illustrated in FIG. 16, the one or more protrusions 500 may also be formed at predetermined intervals along the inner peripheral surface 322.

The second accommodation space 320 may have a size enough to accommodate the rearmost lens 280. In an example, a length Bh of the second accommodation space 320 may be larger than a distance Lhx from a contact point between the rearmost lens 280 and a front member to a point at which the flange portion 284 and the inner peripheral surface 322 of the second accommodation space 320 are in contact with each other.

The one or more protrusions 500 may be formed at a point at which the separation of the rearmost lens 280 may be prevented and a coupling force between the rearmost lens 280 and the lens barrel 300 may be significantly increased. As an example, a distance Ph from a start point of the second accommodation space 320 or the contact point between the rearmost lens 280 and the front member to the center of the one or more protrusions 500 may be larger than Lhx. As another example, a value (Ph−PR) obtained by subtracting a radius PR of the one or more protrusions 500 from Ph may be equal to or larger than Lhx. The one or more protrusions 500 formed as above may support an image-side surface of the rearmost lens 280 to reduce a phenomenon in which the rearmost lens 280 is separated toward the imaging plane, and serve to push up the rearmost lens 280 toward the object side.

The camera module 16 may further include the interval maintaining member 400. The interval maintaining member 400 may be disposed between the first lens group 100 and the second lens group 200. In an example, the interval maintaining member 400 may be disposed between the sixth lens 160 and the rearmost lens 280. The interval maintaining member 400 may maintain a constant distance between the sixth lens 160 and the rearmost lens 280 in the optical axis direction. Additionally, the interval maintaining member 400 may increase the coupling force between the rearmost lens 280 and the lens barrel 300 by allowing a force toward the imaging plane to act on or be transferred to the rearmost lens 280.

The camera module 16 may further include an adhesive member 600 that makes coupling between the rearmost lens 280 and the lens barrel 300 firmer. The adhesive member 600 may be applied between an image-side surface of the rearmost lens 280 and an inner peripheral surface of the lens barrel 300. A groove 2844 that accommodates the adhesive member 600 may be formed in the flange portion 284 of the rearmost lens 280. The groove 2844 formed in the flange portion 284 may increase a contact area between the adhesive member 600 and the rearmost lens 280. The groove 2844 may be formed in a circular shape along a peripheral direction of the flange portion 284 or the grooves 2844 may be partially formed at predetermined intervals along the peripheral direction of the flange portion 284.

In the camera module 16 configured as described above, the coupling force between the lens barrel 300 and the rearmost lens 280 may be improved, and a phenomenon in which the rearmost lens 280 and the other lenses are separated from the lens barrel 300 due to an external impact may thus be remarkably reduced. Additionally, the rearmost lens 280 according to an example can be easily fitted into the second accommodation space 320 in which the one or more protrusions 500 is formed, through the inclination of the outer peripheral surface 2842. Additionally, in the camera module 16 according to the present example, the rearmost lens 280 may be pushed up toward the object side through the one or more protrusions 500 having the semicircular shape to prevent an unnecessary space from being formed between the first lens group 100 and the second lens group 200.

As set forth above, according to one or more examples, a phenomenon in which the lens is separated from the lens barrel due to the external impact may be reduced.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. A camera module, comprising:
   a first lens group, comprising a foremost lens disposed closest to an object;
   a second lens group, comprising a rearmost lens disposed closest to an imaging plane; and
   a lens barrel, in which a first accommodation space and a second accommodation space are formed, the first accommodation space configured to accommodate the first lens group therein, and the second accommodation space configured to accommodate the second lens group therein,
   wherein the second accommodation space is configured to become narrower from an object side toward the imaging plane,
   wherein a portion of an inner peripheral surface of the second accommodation space that is in contact with an outer peripheral surface of the rearmost lens is inclined to form an acute angle with an optical axis,
   wherein a plurality of grooves, which are configured to accommodate an adhesive, is disposed in a flange portion of the rearmost lens,
   wherein the plurality of grooves is partially formed at predetermined intervals along a peripheral direction of the flange portion of the rearmost lens, and
   wherein the adhesive is disposed on the inner surface of the lens barrel.

2. The camera module of claim 1, wherein the first lens group comprises a plurality of lenses.

3. The camera module of claim 1, wherein the first accommodation space has a step.

4. The camera module of claim 1, wherein the foremost lens is configured to be in contact with a plurality of different inner surfaces of the first accommodation space.

5. The camera module of claim 1, wherein the rearmost lens has a diameter greater than a diameter of a lens closest to a rearmost lens in the first lens group.

6. The camera module of claim 1, further comprising an interval maintaining member disposed between the first lens group and the second lens group.

7. The camera module of claim 1, wherein a radius of the portion of the inner peripheral surface of the second accommodation space that is in contact with the outer peripheral surface of the rearmost lens is larger than a maximum radius of the first accommodation space.

8. A camera module, comprising:
   a first lens group, comprising a foremost lens disposed closest to an object;
   a second lens group, comprising a rearmost lens disposed closest to an imaging plane and configured to have a diameter greater than a diameter of the foremost lens of the first lens group; and
   a lens barrel, in which a first accommodation space and a second accommodation space are formed, the first accommodation space configured to accommodate the first lens group therein, and the second accommodation space configured to accommodate the second lens group therein,
   wherein one or more protrusions, configured to support an image-side surface of the rearmost lens of the second lens group, are disposed along an inner peripheral surface of the second accommodation space such that the image-side surface of the rearmost lens is supported on a top surface of the one or more protrusions,
   wherein a plurality of grooves, which are configured to accommodate an adhesive, is disposed in a flange portion of the rearmost lens,
   wherein the plurality of grooves is partially formed at predetermined intervals along a peripheral direction of the flange portion of the rearmost lens, and
   wherein the adhesive is disposed on the inner surface of the lens barrel.

9. The camera module of claim 8, wherein the one or more protrusions are formed at intervals along the inner peripheral surface of the second accommodation space.

10. The camera module of claim 8, wherein the foremost lens is configured to be in contact with a plurality of different inner surfaces of the first accommodation space.

11. The camera module of claim 8, wherein the rearmost lens of the second lens group has a diameter greater than a diameter of a lens closest to a rearmost lens in the first lens group.

12. The camera module of claim 8, wherein a distance between an outer peripheral surface of the rearmost lens of the second lens group, and the inner peripheral surface of the second accommodation space decreases from an object side toward the imaging plane.

13. The camera module of claim 8, further comprising an interval maintaining member disposed between the first lens group and the second lens group.

14. An electronic device, comprising:
    a camera module, comprising a lens barrel,
    wherein the lens barrel comprises:
    a first lens group, comprising a plurality of lenses, where a diameter of a first lens at an object side of the first lens group is smaller than a diameter of a rearmost lens toward an imaging plane of the first lens group; and
    a second lens group, comprising one or more lenses disposed closest to the imaging plane,
    wherein a radius of an accommodation space of the second lens group is larger than a maximum radius of an accommodation space of the first lens group,
    wherein a portion of an inner peripheral surface of the accommodation space of the second lens group that is in contact with an outer peripheral surface of the rearmost lens is inclined to form an acute angle with an optical axis, wherein a plurality of grooves, which are configured to accommodate an adhesive, is disposed in a flange portion of the rearmost lens, wherein the plurality of grooves is partially formed at predetermined intervals along a peripheral direction of the flange portion of the rearmost lens, and wherein the adhesive is disposed on the inner surface of the lens barrel.

15. The electronic device of claim 14, wherein the accommodation space of the second lens group is narrower than the accommodation space of the first lens group from an object side to an imaging plane.

16. The electronic device of claim 14, wherein an interval maintaining member is disposed between the first lens group and the second lens group.

* * * * *